(12) United States Patent
Traasdahl et al.

(10) Patent No.: US 10,290,017 B2
(45) Date of Patent: May 14, 2019

(54) MANAGING ASSOCIATIONS BETWEEN DEVICE IDENTIFIERS

(71) Applicant: TAPAD, INC., New York, NY (US)

(72) Inventors: Are Helge Traasdahl, New York, NY (US); Dag Oeyvind Liodden, New York, NY (US); Vivian Wei-Hua Chang, New York, NY (US)

(73) Assignee: TAPAD, INC., New York, NY (US)

( * ) Notice: Subject to any disclaimer, the term of this patent is extended or adjusted under 35 U.S.C. 154(b) by 207 days.

(21) Appl. No.: 13/677,110

(22) Filed: Nov. 14, 2012

(65) Prior Publication Data

US 2013/0124309 A1 May 16, 2013

Related U.S. Application Data

(60) Provisional application No. 61/559,879, filed on Nov. 15, 2011, provisional application No. 61/563,277, (Continued)

(51) Int. Cl.
*G06Q 30/02* (2012.01)
*G06F 9/50* (2006.01)
*H04L 29/08* (2006.01)

(52) U.S. Cl.
CPC ....... *G06Q 30/0251* (2013.01); *G06F 9/5027* (2013.01); *G06Q 30/02* (2013.01);
(Continued)

(58) Field of Classification Search
CPC ........... G06Q 30/0255; G06Q 30/0244; G06Q 30/0261; G06Q 30/0601; G06Q 30/0269;
(Continued)

(56) References Cited

U.S. PATENT DOCUMENTS 7,769,032 B1 * 8/2010 Ou .......................... H04L 45/04
370/401
7,814,029 B1 10/2010 Siegel
(Continued)

FOREIGN PATENT DOCUMENTS

EP 2323091 A1 5/2011
JP 2002-304568 A 10/2002
(Continued)

OTHER PUBLICATIONS

Marshall, Jack, "Device Fingerprinting Could Be Cookie Killer", Mar. 2, 2011, ClickZ, http://www.clickz.com/clickz/news/2030243/device-fingerprinting-cookie-killer.*
(Continued)

*Primary Examiner* — Ilana L Spar
*Assistant Examiner* — Gautam Ubale
(74) *Attorney, Agent, or Firm* — Wolf, Greenfield & Sacks, P.C.

(57) ABSTRACT

Device identifiers for devices, such as computing devices, software, and applications, etc., are analyzed to determine whether the device identifiers are associated with each other (e.g., are connected to each other) and how strongly the device identifiers are associated with each other. A stronger connection between two device identifiers may indicate that the device identifiers are connected to the same user, same computing device, or same household. Connections between device identifiers are identified and/or weighted if the device identifiers are associated with the same network or if the device identifiers use the same login information to access content. The identifiers and their connections may form a device graph. Content is targeted to the clients based on the device graph. The device graph may also be used to perform targeting and orchestration of advertising, attribution report- (Continued)

ing, analytics, and content optimization across devices in the device graph.

28 Claims, 8 Drawing Sheets

Related U.S. Application Data filed on Nov. 23, 2011, provisional application No. 61/563,963, filed on Nov. 28, 2011.

(52) U.S. Cl.
CPC ......... *G06Q 30/0241* (2013.01); *H04L 67/14* (2013.01); *H04L 67/22* (2013.01)

(58) Field of Classification Search
CPC ........... G06Q 30/0251; G06Q 30/0267; G06Q 30/0241; G06Q 30/0256; G06Q 20/32; G06Q 20/3674
USPC ......... 705/14.49, 14.66, 14.53, 14.54, 14.64, 705/14.58, 26.5, 14.68, 319, 14
See application file for complete search history.

(56) References Cited

U.S. PATENT DOCUMENTS

| | | | |
|---|---|---|---|
| 8,438,184 B1* | 5/2013 | Wang | H04L 67/02 707/780 |
| 8,677,398 B2 | 3/2014 | Shkedi | |
| 8,725,570 B2* | 5/2014 | Doughty et al. | 705/14.66 |
| 9,514,446 B1* | 12/2016 | Rajkumar | H04L 9/0861 |
| 2007/0233759 A1* | 10/2007 | Tomlinson et al. | 708/200 |
| 2008/0109307 A1* | 5/2008 | Ullah | G06Q 30/02 705/14.66 |
| 2008/0126180 A1 | 5/2008 | Ullah | |
| 2009/0089869 A1 | 4/2009 | Varghese | |
| 2009/0187625 A1* | 7/2009 | Blackstock | H04L 12/1818 709/204 |
| 2010/0057843 A1* | 3/2010 | Landsman et al. | 709/203 |
| 2010/0082136 A1 | 4/2010 | Rosenblatt et al. | |
| 2010/0228625 A1* | 9/2010 | Priyadarshan | G06Q 30/02 705/14.49 |
| 2011/0055627 A1* | 3/2011 | Zawacki | H04L 67/14 714/15 |
| 2011/0082858 A1* | 4/2011 | Yu | G06Q 30/02 707/727 |
| 2011/0119267 A1 | 5/2011 | Forman et al. | |
| 2011/0153426 A1* | 6/2011 | Reddy | G06Q 30/02 705/14.58 |
| 2012/0059711 A1* | 3/2012 | Ramer et al. | 705/14.46 |
| 2012/0078708 A1* | 3/2012 | Taylor et al. | 705/14.41 |
| 2012/0215896 A1* | 8/2012 | Johannsen | 709/223 |
| 2012/0233640 A1* | 9/2012 | Odryna et al. | 725/45 |
| 2012/0299925 A1 | 11/2012 | Najork et al. | |
| 2012/0324027 A1* | 12/2012 | Vaynblat | G06Q 50/01 709/206 |
| 2013/0054433 A1 | 2/2013 | Giard et al. | |
| 2013/0159192 A1 | 6/2013 | Patridge et al. | |
| 2013/0226692 A1* | 8/2013 | Kouladjie | G06Q 30/02 705/14.45 |
| 2013/0325601 A1* | 12/2013 | Shekhawat | G06Q 30/02 705/14.49 |
| 2013/0326007 A1* | 12/2013 | Turner et al. | 709/217 |
| 2014/0019542 A1 | 1/2014 | Rao et al. | |
| 2014/0122697 A1* | 5/2014 | Liu | G06F 17/30867 709/224 |
| 2015/0039596 A1 | 2/2015 | Stewart | |
| 2015/0142767 A1 | 5/2015 | Wu et al. | |
| 2015/0370814 A1 | 12/2015 | Liodden et al. | |
| 2016/0182657 A1 | 6/2016 | Mukherjee et al. | |

FOREIGN PATENT DOCUMENTS

| | | |
|---|---|---|
| JP | 2007-018446 A | 1/2007 |
| JP | 2007-041642 A | 2/2007 |
| JP | 2008-535062 A | 8/2008 |
| JP | 2008-242805 A | 10/2008 |
| JP | 2009-017298 A | 1/2009 |
| JP | 2009-512940 A | 3/2009 |
| JP | 2009-271661 A | 11/2009 |
| JP | 2010-146153 A | 7/2010 |
| JP | 2011-159264 A | 8/2011 |
| JP | 2011-524560 A | 9/2011 |
| JP | 2011-210263 A | 10/2011 |
| JP | 2015-503148 A | 1/2015 |
| WO | WO 2011/081818 A | 7/2011 |
| WO | WO 2011/104864 A1 | 9/2011 |
| WO | WO 2013/070687 A1 | 5/2013 |

OTHER PUBLICATIONS

"How does a tracking pixel work" by Quora.*
International Preliminary Report on Patentability, International Search Report and the Written Opinion of the International Searching Authority from corresponding PCT/US2012/065220 dated May 20, 2014.
International Preliminary Report on Patentability from corresponding PCT/US2012/065220 dated May 30, 2014.
International Search Report and Written Opinion from corresponding PCT/US2016/049930 dated Nov. 9, 2016.

* cited by examiner

MANAGING ASSOCIATIONS BETWEEN DEVICE IDENTIFIERS

RELATED APPLICATIONS

This application claims the benefit of U.S. Provisional Application No. 61/559,879, titled "SYSTEM AND METHOD FOR REAL-TIME BIDDING ACROSS BRIDGED PLATFORMS" filed on Nov. 15, 2011, U.S. Provisional Application No. 61/563,277, titled "SYSTEM AND METHOD FOR USING DEVICE FINGERPRINTS TO TRACK USERS IN A PRIVACY-SECURE MANNER" filed on Nov. 23, 2011, and U.S. Provisional Application No. 61/563,963, titled "SYSTEM AND METHOD FOR USING DEVICE SIGNATURES TO TRACK USERS IN A PRIVACY-SECURE MANNER" filed on Nov. 28, 2011, the contents of which are hereby incorporated by reference herein.

BACKGROUND

The use of computing devices such as computer systems, smartphones, laptops computers, tablet computers, netbook computers, smart televisions, personal digital assistants (PDAs), cell phones, media players, gaming consoles (e.g., PlayStation®, XBOX®), smart televisions (TVs), etc., is now prevalent. Users often employ various computing devices and various applications to access content online. For example, a user may use a laptop computer and a first type of browser (e.g., Firefox®) to access a news website or a social networking website when the user is at home. The user may also use a smartphone and a second type of browser (e.g., Safari®) to access such websites (e.g., the news website and/or the social networking website) when the user is at another location (e.g., at work or at a grocery store, etc.). The user may also use various applications to access online content. For example, many publishers, such as news, email, and/or social network publishers (e.g., Yahoo®, Facebook®, CNN®, or other companies or entities that provide online content, etc.) provide applications which allow users to access email, website, and/or other content without using a browser application.

Many entities (such as companies that sell/market goods or services, advertisers, marketing firms, etc.) use various forms of online advertising to advertise and/or market various products and/or services to user. Online advertising may involve the serving of advertisements (e.g., banners, text, images, video clips, audio clips, other rich media, etc.) to users when the users access content (e.g., when a user visits a particular website or when a user views a particular streaming video). For example, when a user visits a website, an advertisement server may deliver and/or provide an advertisement to a region and/or portion of the web site for viewing by the user. The size and position of the advertisement may vary based on the design of the particular website. For example, the advertisement may be a banner with text and images that is displayed in a left region of the website (e.g., along the left side of the website). In another example, the advertisement may be a video clip that is displayed on the top region of the website (e.g., along the top of the website).

In order to achieve better targeting of specific audiences of users, many advertisers and/or companies use techniques such as cookies and pixels to track how users are interacting with different websites. Cookies may be data that is sent from a website and stored in a user's web browser. The cookie data may be accessed while a user is browsing the website. Some websites contain instructions that can save and edit information in a user's cookie. For example, a cookie generated by a retail website may contain information such as (i) products viewed and/or purchased by a user, (ii) information about the user such as internet protocol (IP) address, computer/browser type, and (iii) date/time of the user's last visit to the website. Pixels may be used to place and update cookies and may allow third parties (such as website publishers and/or advertisers) to place and update cookies in order to track how and when users are interacting with particular websites. By using cookies and pixels to track user interaction with certain websites, advertisers and/or companies may be able to personalize and orchestrate advertising or content to certain types of users based on information gathered from the cookies and pixels.

SUMMARY

Companies and/or advertisers use tracking techniques such as cookies and pixels to track how users interact with different websites and other digital services. However, these techniques do not allow advertisers to track the activities of users across multiple browsers and/or applications on the same device. For example, different applications (e.g., different browsers applications such as Firefox® and Safari®) on the same computing device may appear as different devices/identifiers to server systems/platforms (e.g., software, servers, computers and/or other components used by advertisers and companies to provide and track advertisements). These techniques also do not allow advertisers and/or companies to track the activities of users across multiple devices. For example, a user may have both a laptop computer and a smartphone. Existing techniques, such as cookies and pixels, may not be able to link or track the user's behavior and/or activities across both the laptop computer and the smartphone. Consequently, advertisers are not able to target and/or orchestrate advertisements (e.g., ads) to the same user on multiple devices or across multiple browsers/applications.

System and methods of tracking, managing, and/or using device identifiers are disclosed herein. A device identifier may be an identifier (e.g., a cookie ID, a derived identifier based on website header information, such HyperText Transfer Protocol header (HTTP) header information/fields, and other parameters, a hardware or an operating system identifier (such as an iOS® Identifier For Advertisers (IDFA) or an Android® device ID for a smartphone, etc.), a network device identifier such as an Internet Protocol (IP) address for a laptop, a Medium Access Control (MAC) address for a tablet, an International Mobile Equipment Identity (IMEI) number for a smart phone, etc.) used by a device when the device accesses content (e.g., access a news website, access posts or messages on a social networking website, etc.). A device may be a computing device (e.g., a smartphone, a tablet computer, a laptop computer, a desktop computer, etc.) and/or an application, software, software modules, and/or other component on the computing device (e.g., a web browser, a mobile application installed on a smartphone, etc.). When the different computing devices, applications, software, software modules and/or other components access content (e.g., websites, services, and/or locations) online, one or more device identifiers may be recorded, captured, and/or stored by servers that host the content. For example, when a user access a news website using a web browser application on a smartphone, the servers that host content for the news website may record the IP address of the computing device, other website header information (e.g., HTTP header information/fields), and an identifier for the web browser application (e.g., an identifier in a cookie for the website such as a cookie ID, a Globally Unique IDentifier (GUID)).

In one embodiment, the servers may provide network data to an identifier module or the servers may provide the network data to a network data server that may provide the network data to the identifier module. The network data may include a device identifier for a device (e.g., a computing device and/or an application), a type of a network used by the device (e.g., a residential/home network), an identifier for the network (e.g., an IP address for the network gateway), an identifier for the servers that host the content (e.g., an IP address or a domain name for the servers), information about a software/application (such as the type of a browser application/user agent), other website header information (e.g., HTTP header information/fields), and/or a time that the content was accessed (e.g., Sep. 1, 2012 at 1:25 PM PST). In one embodiment, the header information may include information such as the type of application or software, modules that are used by the application or software (e.g., add-ons or extensions used by a browser application), the type of operating system that the application or software is running on, type and version of browser, etc. All or some of the information above may also be referred to as a user-agent string. In one embodiment, the website header information may include HTTP header information/fields including, but not limited to, the domain name of a server that hosts content, a date, a referrer (e.g., the name of a previous website or web page), the content type (e.g., HTML content, portable document format (PDF) content, digital video, etc.), a cookie ID, authorization credentials (e.g., username and/or password), etc.

The identifier module may use the network data to identify connections between different device identifiers. For example, a first device with a first device identifier (e.g., a smartphone with a an iOS® IDFA) may access a mobile application and second device with second device identifier (e.g., a laptop with a cookie ID) may access a different website using the same network (e.g., both devices access the different websites from the same Wi-Fi network in a user's residence or home). The identifier module may associate the first device identifier (e.g., the iOS® IDFA) and the second device identifier (e.g., the cookie ID) with each other because both device identifiers used the same network (e.g., may identify a connection between the first device identifier and the second device identifier). In another example, a user may log into a partner's (e.g., advertiser's, publisher's) website or application that requires user credentials using a web browser application (with a cookie ID) on a laptop and may later use a mobile application on a smartphone (with a Android® device ID) to log into the same partner's (e.g., advertiser's, publisher's) website/application. The identifier module may associate the cookie ID with the Android® device ID (e.g., may identify a connection between the cookie ID and the Android® device ID) because both the cookie ID and the Android® device ID were used by devices (e.g., computing devices, software, and/or applications) when accessing the partner's (e.g., advertiser's, publisher's) website. In one embodiment, the identifier module may collect anonymized login information (e.g., hashed/obfuscated usernames) from different advertisers/publishers (e.g., from an email website). The identifier module may identify a connection between two different device identifiers (e.g., between the computing devices and/or applications associated with the different device identifiers) if the two different devices use the same login information to access content from the partner (e.g., advertiser, publisher).

In one embodiment, the identifier module may assign weights to the connections between the device identifiers. The identifier may also adjust or modify the weights based on various criteria and/or conditions (as discussed in more detail below in conjunctions with FIGS. 1-7). For example, the weight of a connection between a first device identifier and a second device identifier may be increased if the two device identifiers use the same network to access content within a certain period of time (e.g., within seven days). In another example, the weight of the connection between the first device identifier and the second device identifier may be decreased if the two device identifiers do not use the same network to access content within a certain period of time (e.g., within thirty days).

In one embodiment, the identifier module may use the connections and/or the weights of the connections between device identifiers to provide content, such as advertising, to different devices. For example, the identifier module may perform advertisement targeting and/or retargeting of users or audiences across different computing devices. In another example, the identifier module may perform attributions (e.g., attributing a sale or conversion to an advertisement) across different computing devices. In a further example, the identifier module may perform other functions including, but not limited to, brand survey delivery, campaign/audience analytics, frequency capping, and lookalike modeling, across different computing devices and/or applications.

The above summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
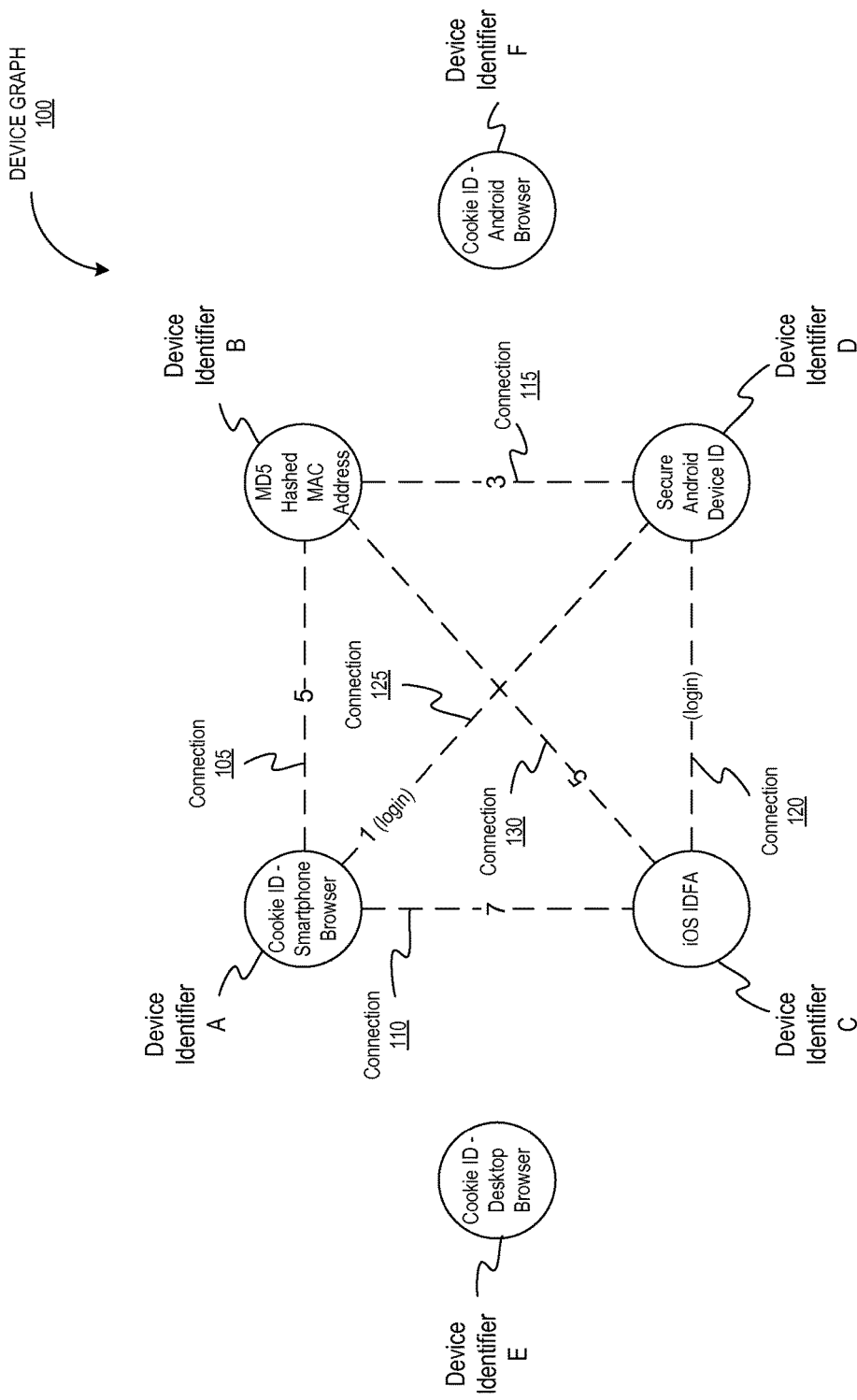
FIG. 1 is a diagram illustrating an exemplary device graph, according to one embodiment.

FIG. 1 is a diagram illustrating an exemplary device graph 100, according to one embodiment. The device graph 100 includes six device identifiers, device identifier A, device identifier B, device identifier C, device identifier D, device identifier E, and device identifier F. As discussed above, the device identifier may be an identifier used by a device when the device accesses content (e.g., accesses a news website). Device identifier A is a cookie ID for a browser application on a smartphone, device identifier B is an MAC address for a computing device that has been hashed using the Message Digest-5 (MD-5) hashing function/algorithm, device identifier C is an iOS® Identifier For Advertisers (IDFA), device identifier D is a Android® device ID, device identifier E is a cookie ID for a browser application on a desktop computer, and device identifier F is a cookie ID for a browser application on an Android® device. In the device graph 100, a device identifier may represent a device that associated with the device identifier (e.g., may represent the device that is using the device identifier). In one embodiment, a device may be a computing device and/or an application, software, software modules, and/or other component on the computing device. For example, the device may be one or more of a desktop computer, a laptop computer, a server computer, a PDA, smartphone, web-enabled television set, smart television set, a gaming console, and/or any other device capable of to processing, managing and/or transmitting data. In another example, the device may be software, a software module, an application, and/or other component on a computing device. In another example, the device may be one or more of a web browser, an application (e.g., a mail application or a social networking application installed on smartphone), a game application, a media player application (e.g., a video player or a music player), a software module (e.g., an add-on or a component for a browser application), etc.

Each device (e.g., each computing device and/or each software or application) may have one or more device identifiers. For example, a smartphone (e.g., a device) may have a MAC address, a serial number (e.g., a serial number from a manufacturer an Open Device Identification Number (ODIN), a Unique Device Identifier (UDID), an OpenUDID, a Globally Unique Identifier (GUID), an IMEI number, an IP address, etc., which may each be device identifiers. In another example, applications, software, and/or software modules may also have device identifiers. For example, an application on a computing device may have a serial number which may be the device identifier for the application. In another example, a web browser application may have cookie which includes an identifier and the identifier in the cookie (e.g., the cookie ID) may be the device identifier for the web browser application. In a further example, an application (e.g., a mobile news application, a game, etc.) may use different types of device identifiers (e.g., a GUID, a UUID, etc.). In other embodiments, device identifiers may include, but are not limited to, IP addresses, a MAC addresses, IMEI numbers, serial numbers, ODINs, UDIDs, OpenUDIDs, GUIDs, cookie IDs, an iOS® IDFA, an Identifier for Vendors (IDFV), and/or any other data/information which may be used to identify a device (e.g., an application, software, and/or a computing device). In one embodiment, a device identifier may be a number (e.g., 734598238742), an alphanumeric value (e.g., A984FDSJL334), a string of characters (e.g., HZ$98!324*J), or any type of value that may be used to identify a device (e.g., an application, software, and/or a computing device).

In one embodiment, a device (e.g., a computing device, an application, software, a software module, etc.) may generate a device identifier. For example, when the application (e.g., a device) is installed onto the computing device the application (or an installer/install file for the application) may generate a device identifier based on a MAC address for the computing device. In another example, a computing device (e.g., a device, such as a smartphone), may generate a device identifier based on other identifiers for the computing device (e.g., the smartphone may generate a device identifier based on an IMEI number or a UDID for the smartphone). In some embodiments, the device (e.g., a computing device, an application, etc.) may use a variety methods, algorithms, operations, and/or functions, to generate device identifiers. For example, an application on a computing device may use a cryptographic hash function (e.g., Secure Hash Algorithm-1 (SHA-1), Secure Hash Algorithm-2 (SHA-2), Message Digest-5 (MD-5), etc.) to generate a device identifier for the application based on an IMEI for the computing device. In another example, a computing device (e.g., a tablet computer) may use a random number generator (e.g., a Pseudo-Random Number Generator (PRNG)) to generate a device identifier based on a MAC address for the computing device.

Referring back to FIG. 1, the device identifier A is connected to device identifier B via connection 105, to device identifier C via connection 110, and to device identifier D via connection 125. The device identifier B is connected to the device identifier C via connection 130 and to device identifier D via connection 115. The device identifier C is connected to the device identifier D via connection 120. Device identifier E and device identifier F are not connected to other device identifiers. Each of connections 105, 110, 115, 125, and 130 has a weight associated with the connection. Connection 105 has a weight of 5, connection 110 has a weight of 7, connection 115 has a weight of 3, connection 120 does not include a weight, connection 125 has a weight of 1, and connection 130 has a weight of 5. In one embodiment, the connections in the device graph 100 (e.g., connections 105, 110, 115, 120, 125, and 130) may be identified based on (i) network data (e.g., identified based on whether device identifiers used the same network/network gateway), (ii) login information (e.g., based on whether two devices for two device identifiers used the same login information to access content from a partner such as a publisher, an advertiser, etc.), and/or (iii) both network data and login information.

In one embodiment, the weight of the connection (e.g., the weight 7 for connection 110) may be indicative of how closely or how strongly two device identifiers are associated with each other. For example, the weight for each connection may be a numeric value (e.g., a number). A higher numeric value may indicate that two device identifiers are closely associated with each other and a lower numeric value may indicate that two device identifiers are less closely associated with each other. In one embodiment, a closer association between two device identifiers may indicate that the two device identifiers originate from the same computing device. For example, a first device identifier may be an identifier for a computing device (e.g., a smartphone) and a second device identifier may be for an application (e.g., a web browser) that is used on the computing device. In another example, a first device identifier may be an identifier for a first application (e.g., a web browser) on a computing device and the second device identifier may be for a second application (e.g., a game or a social networking application) on the same computing device. In another embodiment, a closer association between two device identifiers may indicate that the two device identifiers originate from computing devices that are used by the same user, or that are used by users who know each other (e.g., members of a household, friends, etc.). For example, the first device identifier may be for a first computing device (e.g., a smartphone) used by a user and the second device identifier may be for a second computing device (e.g., a laptop computer) used by the same user. In another example, the first device identifier may be for a first computing device (e.g., a tablet computer) used by a user and the second device identifier may be for a second computing device (e.g., a laptop computer) used by a family member (e.g., husband, wife, brother, sister, son, daughter, etc.) of the user.

In one embodiment, the connections 105, 110, 115, 120, 125, and/or 130 may also include other information in addition to the weights. For example, the connection 120 includes information (e.g., the text/value "login") indicating that the connection 120 was established because the device associated with device identifier C and the device associated with device identifier D used the same login information (e.g., same username/password) to access content from a partner (e.g., publisher, advertiser). In another example, the connection 125 includes information (e.g., the text/value "login") indicating that the connection 125 was identified because the device for device identifier A and the device for device identifier D used the same login information to access content from a publisher (e.g., used the same username/password to access an email account), and information (e.g., the weight "1") indicating that the connection 125 was also identified because device identifier A and device identifier D used the same network gateway (e.g., accessed the publisher service via the same Wi-Fi network). In addition, the connection may also include information indicating the name of the partner (e.g., a publisher, an advertiser, etc.) that provided the login information. For example, the connection may include the text/value "login—Gmail®" indicating that the login information was received from Google®, or the connection may include the text/value "login/Pandora®" indicating that the login information was received from Pandora®. In a further example, the connection may also include information indicating where the network data (that was used to identify the connection) was obtained from (e.g., a merchant server, a content server, an advertisement server, a network data server, etc.). Although strings or text are illustrated in FIG. 1 to represent the additional information, in other embodiments, the additional information (e.g., information indicating how a connection was identified) may be represented using other strings, numbers, alphanumeric values, and/or other representations. For example, the text "network" may be included in a connection to indicate that the connection was identified because two device identifiers used the same network.

In one embodiment, the connections between the device identifiers may not include weights. For example, when a connection between two device identifiers is identified using login information, the connection may not include a weight.

Figure 3:
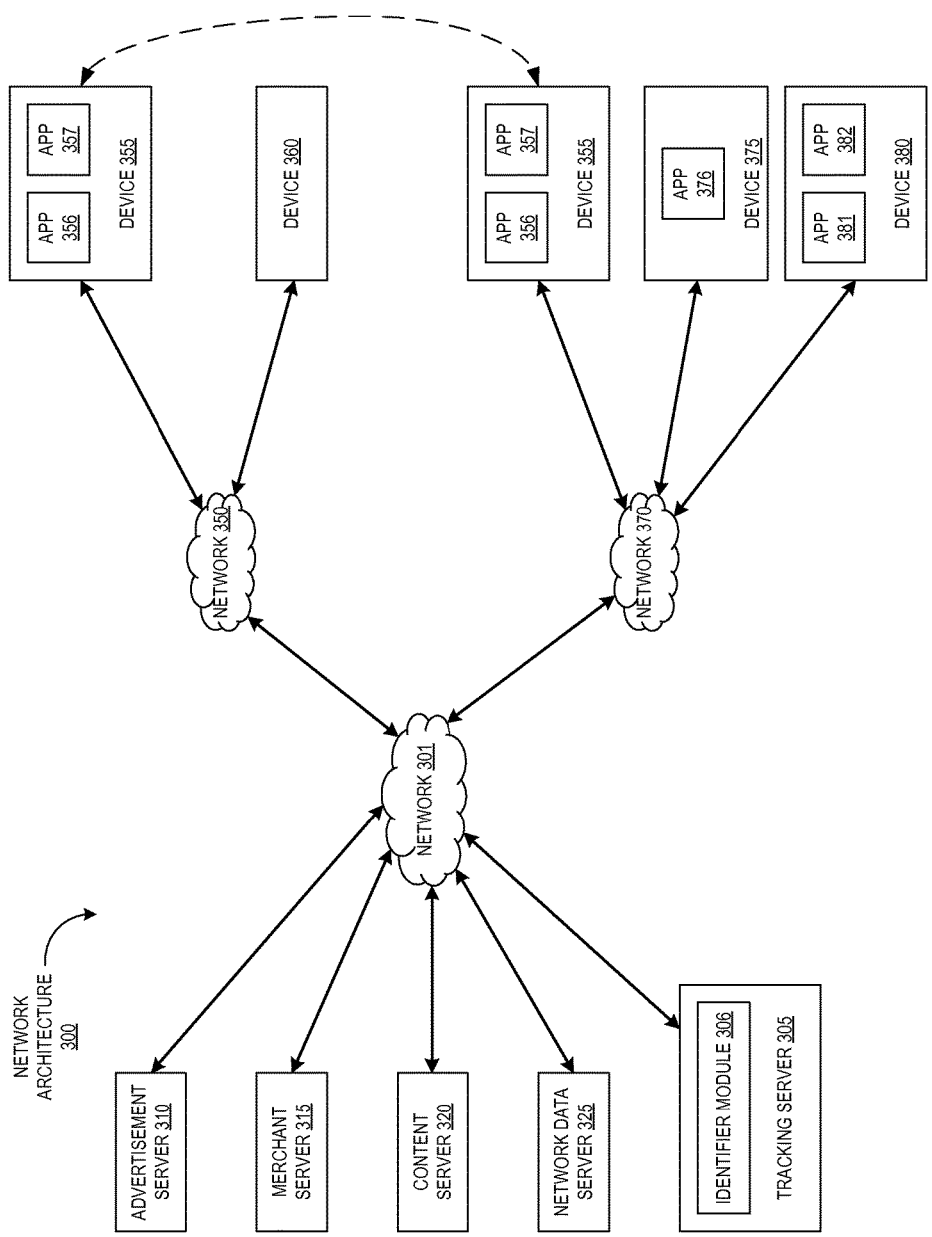
FIG. 3 is a block diagram of an exemplary network architecture, in which embodiments of the present disclosure may operate.

As discussed above, the connections 105, 110, 115, 120, 125, and 130, and the weights for the connections may be determined or identified using network data and/or login information (e.g., username and/or password) that is used by different devices to access a partner's (e.g., publisher's, advertiser's) website. The network data may include a device identifier (e.g., an iOS® IDFA, a Android® device ID, an identifier in a cookie, etc.) for a device (e.g., a computing device and/or an application), a type of a network used by the device (e.g., whether the network is a residential/home network, or a commercial/business/corporate network), an identifier for the network (e.g., an IP address for the network, such as the IP address for a Wi-Fi router) that is used by the device, a type for the content that was accessed by the computing device and/or application (e.g., news content, music content, video content, etc.), an identifier for the servers that host the content (e.g., an IP address or a domain name for the servers), user agent information (e.g., the type of a browser, such as Mozilla®, Safari®, Firefox®, Chrome®, Internet Explorer®, etc.), website header information (e.g., HTTP headers/fields), and/or a time that the content was accessed (e.g., Sep. 1, 2012 at 1:25 PM PST). In one embodiment, the network data may be generated, obtained and/or inferred by a server (e.g., tracking server 305, network data server 325, etc., as shown in FIG. 3) based on other data (e.g., based on other network data). For example, based on the IP address of a device, the server may be able to determine the type of the network (e.g., whether the network is a residential or a commercial network) by performing an IP address lookup.

The servers which host or store the content (e.g., websites, multimedia content, etc.) that is accessed by the devices may obtain and/or record network data when the device accesses the content. For example, a server that hosts a news website may obtain a cookie ID for a web browser on a smartphone. In another example, a server that hosts social networking content may obtain an IP address for a tablet computer that accesses the social networking content. In one embodiment, these servers may provide the network data (e.g., device identifiers, network types, identifiers for the servers, etc.) to an identifier module (e.g., as illustrated and discussed further below in conjunction with FIGS. 3-4). The identifier module may obtain and/or create a device graph (such as device graph 100) based on network data received from the servers. In another embodiment, the servers may provide the network data to a network data server (e.g., a server for an online data vendor/partner which collects and stores the network). For example, the network data server may collect network data from multiple servers that host different content. In another example, one or more of a content server, a merchant server, and an advertisement server may provide the network data to the identifier module. The network data server may provide the network data to the identifier module. The identifier module may obtain and/or create a device graph (such as device graph 100) based on network data received from the servers. In a further embodiment, an application/software on a computing may obtain device identifiers such as a MAC address, an IP address, an IMEI number, a UDID, etc., and may provide these identifiers to the identifier module. For example, a game application that is installed on a smartphone may obtain the iOS® IDFA for the smartphone and may provide the iOS® IDFA to the identifier module.

In another embodiment, the identifier module may obtain login information and network data from different servers. The identifier module may identify connections between different device identifiers, based on the login information. For example, the identifier module may obtain hashed login information that was used to access an email server. The identifier module may determine that two different devices (each with different device identifiers) used the same login information (e.g., same username and/or password) to access an email account. The identifier module may create a connection between the two device identifiers (e.g., between the two devices) because the two devices associated with the two device identifiers used the same login information to access the email account.

In one embodiment, the weights for the connections 105, 110, 115, 120, 125, and 130, and the weights may be increased or decreased based on different criteria, rules, factors, and/or conditions. For example, the weight for the connection 105 may be increased if device identifier A and device identifier B are seen on the same residential network within a period of time (e.g., seven days). In another example, the weight for connection 130 may be decreased of device identifier B and device identifier C have not been seen on the same residential network for a period of time (e.g., two weeks). The identifier module (as illustrated and discussed further below in conjunction with FIGS. 3-4) may increase and/or decrease the weights for the connections 105, 110, 115, 120, 125, and 130 based on the network data received from the servers and/or the network data server. The adjustment and/or modification of the weight are discussed in more detail below in conjunction with FIGS. 3-4.

In one embodiment, device identifiers may be removed from the device graph 100. For example, device identifier E is not connected to other device identifiers. After a period of time (e.g., 30 days, 7 days, etc.), the device identifier E may be removed from the device graph 100 if the device identifier E is still not connected to other identifiers or the device identifier has not been refreshed in a threshold period of time. In another embodiment, device identifiers may be added to the device graph 100. For example, a new device identifier may be added to the device graph and a new connection may connect the new device identifier to device identifier F (not shown in the figures).

In one embodiment, a server may manage, update, and/or track all device identifiers (e.g., all identifiers for computing devices, software, application, etc.) and the connections between all the device identifiers using a single device graph. Because all device identifiers may be included in a single device graph, the single device graph may include disjointed groups of connected device identifiers and single device identifiers that have no connections. In another embodiment, there may be separate device graphs that contain different device identifiers and connections.

Figure 2:
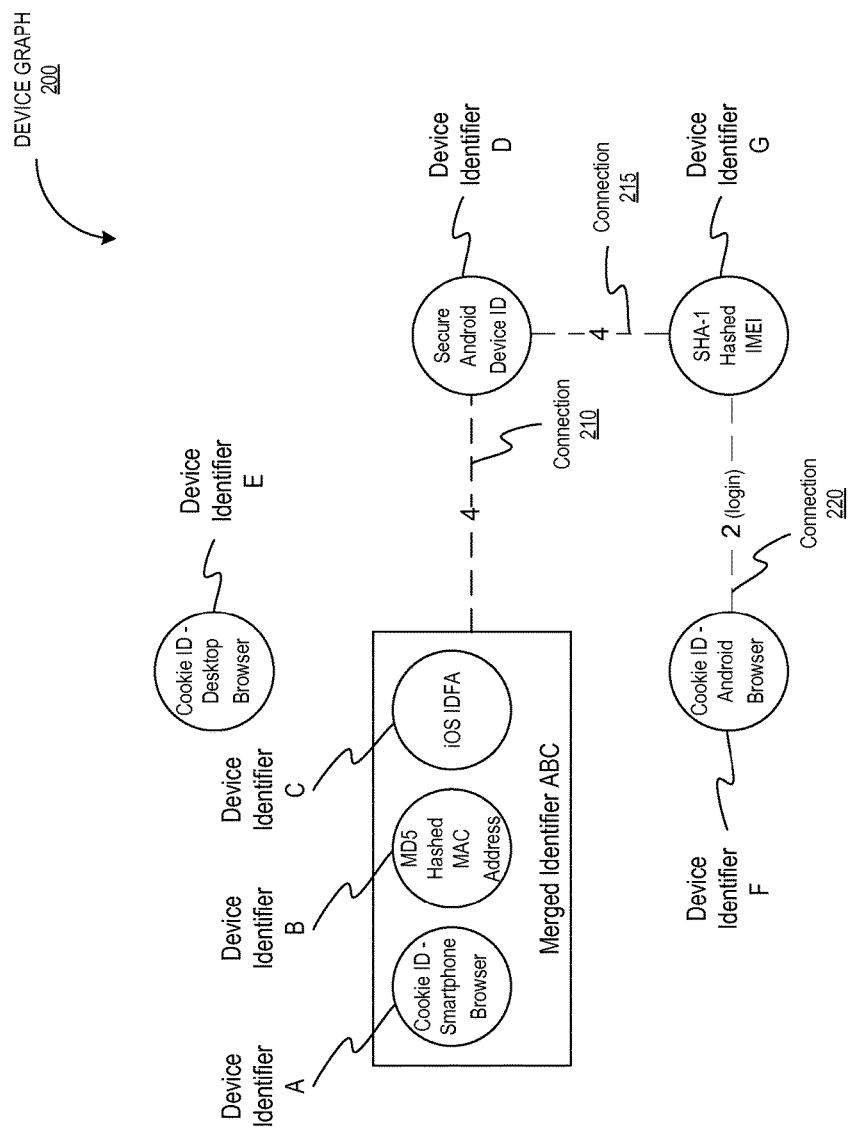
FIG. 2 is a diagram illustrating an exemplary device graph, according to another embodiment.

FIG. 2 is a diagram illustrating an exemplary device graph 200, according to another embodiment. The device graph 200 also includes device identifier A, device identifier B, device identifier C, device identifier D, device identifier E, device identifier F, and device identifier G. Device identifier A is a cookie ID for a browser application on a smartphone, device identifier B is an MAC address for a computing device that has been hashed using the Message Digest-5 (MD-5) hashing function/algorithm, device identifier C is an iOS® Identifier For Advertisers (IDFA), device identifier D is a Android® device ID, device identifier E is a cookie ID for a browser application on a desktop computer, device identifier F is a cookie ID for a browser application on an Android® device, and device identifier G is an IMEI for a computing device that has been hashed using the Secure Hashing Algorithm-1 (SHA-1). The graph 200 also includes a merged identifier ABC. The merged identifier ABC aggregates device identifier A, device identifier B, and device identifier C, so that they are equivalent. Merged identifier ABC is connected to device identifier D via connection 210 and connection 210 has a weight of 6. Device identifier D is connected to device identifier G via connection 215 and connection 215 has a weight of 4. Device identifier F is connected to device identifier G via connection 220 and the connection 220 has a weight of 2. The connection 220 also includes information (e.g., the text/value "login") indicating that the connection 220 was identified because both the device identifier F and the device identifier G accessed content (e.g., a website, a service, etc.) using the same login information (e.g., same username/password).

In one embodiment, device identifiers may be merged if the device identifiers originate from the same computing device. For example, device identifier A may be an identifier for the computing device's operating system (e.g., an iOS® IDFA), device identifier B may be an identifier for a web browser (e.g., a cookie ID), and device identifier C may be an identifier for another application (e.g., a game application) on the computing device (e.g., a serial number for a second application). One of the applications (e.g., the game application) may obtain different identifiers for the computing device and/or the applications on the computing device. For example, the game application may obtain the IMEI number, the iOS® IDFA, and a cookie ID. The game application may provide these identifiers to the identifier module and may indicate that these three identifiers originate from the same computing device and/or user. The identifier module may merge the different identifiers in a device graph, based on this information. In one embodiment, after device identifiers are merged, when the identifier module later accesses the device graph to find a device identifier, the merged device identifiers are stored as being equivalent to each other. For example, when the identifier module accesses device graph 200 to find device identifier A, the device identifier A is stored in the device graph 200 as being equivalent to device identifier B and/or device identifier C.

In another embodiment, device identifier may be merged when cookie syncing is performed. For example, an advertiser or a publisher may implement cookie syncing between an advertisement exchange (e.g., an ad exchange where bids for advertisements are processed). The advertiser/publisher may use a first cookie ID (e.g., cookie ID A) and the advertisement exchange may use a second cookie ID (e.g., cookie ID B). The identifier module may merge the first cookie ID and the second cookie ID because the publisher and the advertisement exchange have synced the two cookie IDs (e.g., both cookie IDs belong to the same device).

In one embodiment device identifiers may not be merged even though the device identifiers are associated with the same login information or user credentials. For example, as discussed above, the identifier module may identify a connection between two device identifiers because the two device identifiers are associated with the same login information (e.g., same user credentials). The identifier module may not merge the two device identifiers, but may indicate in the connection (e.g., in the extra information included in the connection) that the connection was identified based on login information. In another embodiment, device identifiers may be merged if the device identifiers are associated with the same user credentials for a server. For example, a user may use desktop computer at work to log into an email website. The desktop computer may have the device identifier A. The user may also use an email application on a smartphone to access the same email website when the user is away from a computer. The email application may have the device identifier B. The user may also use a web browser on a tablet computer to access the email website when the user is at home (e.g., at the user's residence). The table computer may have the device identifier C. Because the user may use the same user credentials (e.g., username, password, personal identification number (PIN), etc.), the server that hosts the email website may provide network data indicating that device identifiers A, B, and C, are all associated with the same user credentials. The device identifiers A, B, and C, may be merged or combined into the merged identifier ABC, based on the network data.

In one embodiment, when multiple device identifiers are merged, the connections and the weights for the multiple device identifiers may also be merged or combined. For example, as illustrated in FIG. 1, device identifier A is connected to device identifier D via connection 125 that has a weight of 1, device identifier B is connected to device identifier D via connection 115 that has a weight of 3, and device identifier C is connected to device identifier D via connection 120 that was established using login information. Referring back to FIG. 2, the merged identifier ABC includes device identifiers A, B, and C. The merged identifier ABC is connected to device identifier D via connection 210. The connection 210 has a weight 4, which is the sum of the weights for connections 125, 115, and 120 shown in FIG. 1. In other embodiments, the weights for connections that have been merged due to the merging of device identifiers may be obtained using other methods. For example, instead of summing the weights of the merged connections, the average weight of the merged connections may be used.

Although FIGS. 1 and 2 illustrate device identifiers, connections between the device identifiers, and weights for the connections using a graph, this information may be represented using different representations and/or data structures. For example, as illustrated in Table 1 below, the identifiers, connections, and weights for the connections illustrated in FIG. 2 may be represented using a table. As shown in Table 1, the merged identifier ABC is connected to device identifier D and the connection has a weight of 4. Device identifier D is connected to device identifier G and the connection has a weight of 4. Device identifier E is not connected to other device identifiers. Device identifier F is connected to device identifier G and the connection has a weight of 2. Device identifier F is also connected to device identifier G using login information from partner X.

TABLE 1

| Merged Identifier | Device Identifier | Connected Identifier | Weight | Login info |
|---|---|---|---|---|
| ABC | A, B, C | D | 4 | |
| | D | G | 4 | |
| | E | | | |
| | F | G | 2 | Login from partner X |

It should be understood that in other embodiments, the device identifiers, connections, and weights for the connections may be represented using other data structures and/or representations, such as graphs, tables, charts, trees, etc.

FIG. 3 is a block diagram of an exemplary network architecture 300, in which embodiments of the present disclosure may operate. Network architecture 300 includes a tracking server 305, an advertisement server 310, a merchant server 315, a content server 320, and a network data server 325 that are communicatively coupled to a network 301. Network 301 may be a public network (e.g., the Internet), a private network (e.g., a Local Area Network (LAN) or Wide Area Network (WAN)), a wired network (e.g., Ethernet network), a wireless network (e.g., an 802.11 network), a cellular network (e.g., a Long Term Evolution (LTE) network), a broadcast network, and/or a combination thereof. Computing devices may communicate (e.g., send/receive data) with the different servers using the network 301.

Network architecture 300 also includes a network 350 that is communicatively coupled to the network 301 and to devices 355 and 360. In one embodiment, the network 350 may be a residential network or a home network. For example, the network 350 may be a Wi-Fi network in the residence of a user. The network 350 may be coupled to the network 301 via a service provider that provides network connectivity to residential users (e.g., a cable TV service provider, a telephone service provider, an internet service provider, etc.). Network architecture 300 further includes a network 370 that is communicatively coupled to the network 301 and devices 355, 375 and 380 that are communicatively coupled to the network 370. In one embodiment, the network 370 may be a business network, a corporate network, a phone carrier network, and/or a Wi-Fi network (e.g., a Wi-Fi hotspot). For example, the network 370 may be a network that is used by a company to connect multiple computing devices to each other and to the network 301 (e.g., the Internet).

Each of the networks, servers and devices illustrated in FIG. 3 may be communicatively coupled to each other. In one embodiment, two components may be communicatively coupled if they communicate with each other directly. For example, the device 355 may be directly coupled to the network 350 (e.g., directly communicate with the network 350). In another embodiment, two components may be communicatively coupled even if they do not communicate with each other directly. For example, the network 350 communicate data with network 301 via one or more routers, switches, other networks, servers, bridges, and/or other components.

Devices 355, 360, 375, and 380 may each be computing devices (e.g., computing devices, such as a smartphone, a laptop computer, a tablet computer, etc.). Each of the devices 355, 360, 375, and 380 may have one or more device identifiers (e.g., MAC address, IMEI number, serial number, UDID, etc.) Device 355 includes applications 356 and 357 (e.g., a web browser, a game, an email application, etc.). Each of the applications 356 and 357 may also have one or more device identifiers (e.g., cookie IDs, GUIDs, a hash generated based on a MAC address of the device 355, etc.). Device 380 includes applications 381 and 382, and each of the applications 381 and 382 may have one or more device identifiers. Device 375 includes application 376 (e.g., a media player). Each of applications 356, 357, 376. 381 and 382 may have their own unique identifiers and therefore, may also be considered unique devices in the device graph. As shown in FIG. 3, device 355 may use both network 350 and network 370 (as indicated by the dotted line). For example, the device 355 may be a smartphone or a laptop computer for a user. The user may use the device 355 on network 350 (e.g. at home or on a home network) and may later use the device 355 on network 370 (e.g., at work, on a business network, on a carrier network, and/or on a Wi-Fi network).

The merchant server 315 may be a server that hosts a merchant website. For example, the merchant server 315 may host an online store that allows users to purchase products and/or services online. The merchant server 315 may obtain a device identifier from a device (e.g., device 355 or application 356 on the device 355) that accesses the merchant server 315. For example, the merchant server 315 may obtain the IP address of the device 355 and/or may obtain the cookie ID for a web browser (e.g., application 356). The merchant server 315 may provide the device identifier, as well as other network data (e.g., a time or timestamp, an identifier for the merchant server 315, etc.) to the tracking server 305. The content server 320 may be a server that provides content to a user. For example, the content server 320 may host a news website that provides news, updates, and other information to a user. In another example, the content server 320 may be a server that hosts a social networking website or an email website. The content server 320 may obtain a device identifier from a device (e.g., device 380 or application 381 on the device 380) that accesses the content server 320. For example, the content server 320 may obtain the cookie ID of the device 380 of a browser on that device and/or may obtain the Android® ID through an email application (e.g., application 381) on that device. The content server 320 may provide the device identifier, as well as other network data (e.g., a time or timestamp, an identifier for the content server 320, the type of content that was accessed, etc.) to the tracking server 305. In one embodiment, one or more of the merchant server 315 and the content server 320 may generate, update, and/or store an audience record (e.g., indicating that the device belongs to a certain audience/segment/group). For example, the content server 320 may generate and/or update an audience record that may include a list or other data indicative of different device identifiers accessed certain content (e.g., a certain news article, a certain webpage, etc.). In another example, the merchant server 315 may generate and/or update an audience record that may include a list or other data indicative of different device identifiers that have view a particular item (e.g., a tent), or a category of items (e.g., camping equipment). In another embodiment, the tracking server 305 may generate, update, and/or store the audience record. For example, merchant server 315 and/or the content server 320 may include a pixel (e.g., a tracking pixel) that is provided by the tracking server 305 or the publisher for tracking server 305. The pixel may allow the tracking server 305 to track the device identifiers for devices that have accessed content on the merchant server 315 and/or the content server 320, and to generate/update the audience record.

The advertisement server 310 may be a server that provides advertisements (e.g., ads) to the other servers and/or to the devices 355. For example the advertisement server 310 may provide an advertisement to the content server 320 and the content server may provide the advertisement, along with content (e.g., a news article) to a device, such as device 355. In another example, the advertisement server 310 may provide the advertisement to the device 355 itself. In one embodiment, the advertisement server 310 may generate, update, and/or store an impression history. The impression history may be a list or other data indicating the different advertisements that have been provided to different devices (e.g., provided to an application, such as a web browser, or a computing device, such as a smartphone). The advertisement server 310 may obtain the device identifier for the device (e.g., from content server 320 or merchant server 315) and may associate the device identifier with each advertisement in order to track whether an advertisement has been displayed, shown, or provided to the device. In one embodiment, the advertisement 310 may perform targeting, attribution, behavioral analysis, frequency capping, and lookalike modeling, based on a device graph received from the identifier module 306 (as discussed below in more detail in conjunction with FIGS. 4 and 7). In another embodiment, the advertisement server 310 may generate, update, and/or store an impression history. The impression history may include a list or other data indicative of different device identifiers that have received advertisements from the advertisement server 310.

The tracking server 305 includes identifier module 306. The tracking server 305 may use the identifier module 306 to obtain and/or generate one or more device graphs (e.g., as illustrated in FIGS. 1 and 2). In one embodiment, the identifier module 306 may obtain network data from the network data server 325 and may use the network data to obtain and/or generate the device graphs. In another embodiment, the identifier module 306 may obtain network data from one or more of the content server 320 and the merchant server 315. In one embodiment, the identifier module 306 may periodically request network data (e.g., request network data once an hour, once a day, etc.) from one or more of the merchant server 315, the content server 320, and the network data server 325. In another embodiment, one or more of the merchant server 315, the content server 320, and the network data server 325 may periodically provide the network data to the identifier module 306 or may provide the network data to the identifier module 306 whenever new network data is obtained.

The identifier module 306 may analyze the network data to determine whether the network data should be used when creating the device graphs. In one embodiment, the identifier module 306 may use only network data that indicates that the device associated with a device identifier was using a residential or home network. For example, the identifier module 306 may discard or may not use network data that is obtained from a business network because the devices (e.g., computing devices or applications) on a business network may not be closely associated with each other. This may help prevent the identifier module from creating connections between devices which are not closely associated with each other. For example, this may prevent the identifier module 306 from creating a connection between a first device identifier for laptop computer used a user and a second device identifier for a desktop computer used by a co-worker of the user. In another embodiment, the identifier module 306 may use network data that is obtained from a business network to adjust the weights of the connections if devices that use the business network were previously seen on a home or residential network. In another embodiment, the identifier module 306 may use network data that is obtained, such as location data (e.g., a device's GPS location) or contextual data (e.g., accessing a specific news site every day) to adjust the weights to show a stronger connection between two device identifiers (e.g., increase the weight of a connection).

In one embodiment, the identifier module 306 may discard network data from a network if more than a threshold number of devices use the network within a threshold amount of time. For example, if more than five devices (e.g., more than five computing devices) use a particular network within an hour, the network data associated with that network (e.g., network data that includes an identifier for that network) may be discarded or may not be used.

The identifier module 306 may also remove device identifiers from the device graph, based on network data. In one embodiment, if a device identifier is connected to more than a threshold number of device identifier within a threshold amount of time, the identifier module may remove the device identifier and its associated connections from the device graph. For example, if a device identifier is connected to more than five other device identifiers within an hour, the device identifier and its associated connections may be removed from the device graph. In another embodiment, the identifier module 306 may remove a device identifier and its associated connections from the device graph if the device identifier is connected to more than a threshold number of other device identifiers. For example, the identifier module 306 may remove a device identifier if it is connected to more than forty other different device identifiers. In a further embodiment, the identifier module 306 may remove a device identifier and its associated connections from the device graph if the device identifier is included in network data over a threshold number of times within a threshold period of time. For example, the identifier module 306 may remove a device identifier from the device graph if the device identifier appears in five different network data sets received from different servers within an hour, because this may indicate that the device associated with the device identifier may not be a consumer computing device (e.g., the device may be a proxy server computer that forwards and receives data for multiple computing devices).

The identifier module 306 may also adjust the weights of the connections between device identifiers based on how frequently and/or recently the device identifiers appear on the same network. In one embodiment, the identifier module 306 may increase the weight of a connection between two device identifiers, if the two device identifiers have recently appeared on the same network (e.g., both device identifiers used the same residential network) within a threshold period of time. For example, the weight of a connection between two device identifiers may be increased by one (or some other value) each time the two device identifiers appear on the same network within the last seven days. In a further embodiment, the identifier module 306 may decrease the weight of a connection between two device identifiers, if the two device identifiers do not appear on the same network within a threshold amount of time. For example, if two device identifiers to not use the same network within a month, the weight of the connection between the two device identifiers may be decreased. In one embodiment, the identifier module 306 may remove a connection that has weight of zero from the device graph (e.g., the two device identifiers may not longer be connected or associated with each other). In another embodiment, the identifier module 306 may remove device identifiers that have no connections to other device identifiers from the device graph after a period of time. For example, a device identifier may be removed from the device graph if the device identifier has had no connections for longer than fourteen days or the device has not been refreshed in fourteen days.

It should be understood that in other embodiments, different threshold periods of time (e.g., 30 minutes, 2 hours, 5 days, 1 month, etc.) and different threshold values (e.g., 5, 20, 100) may be used by the identifier module 306 when determining whether to use network data, when determining whether to remove device identifiers and connections, and/or when adjusting the weights of the connections. In other embodiments, the weights may be values other than numeric values. For example, the weights may be alphanumeric strings. The weights may also use different scales (e.g., a lower value may indicate that two identifiers are more closely associated instead of a higher value). In addition, in some embodiments, the identifier module 306 may remove merged identifiers, may remove connections connected to the merged identifiers, and/or may adjust the weight for connections connected to the merged identifiers.

Figure 4:
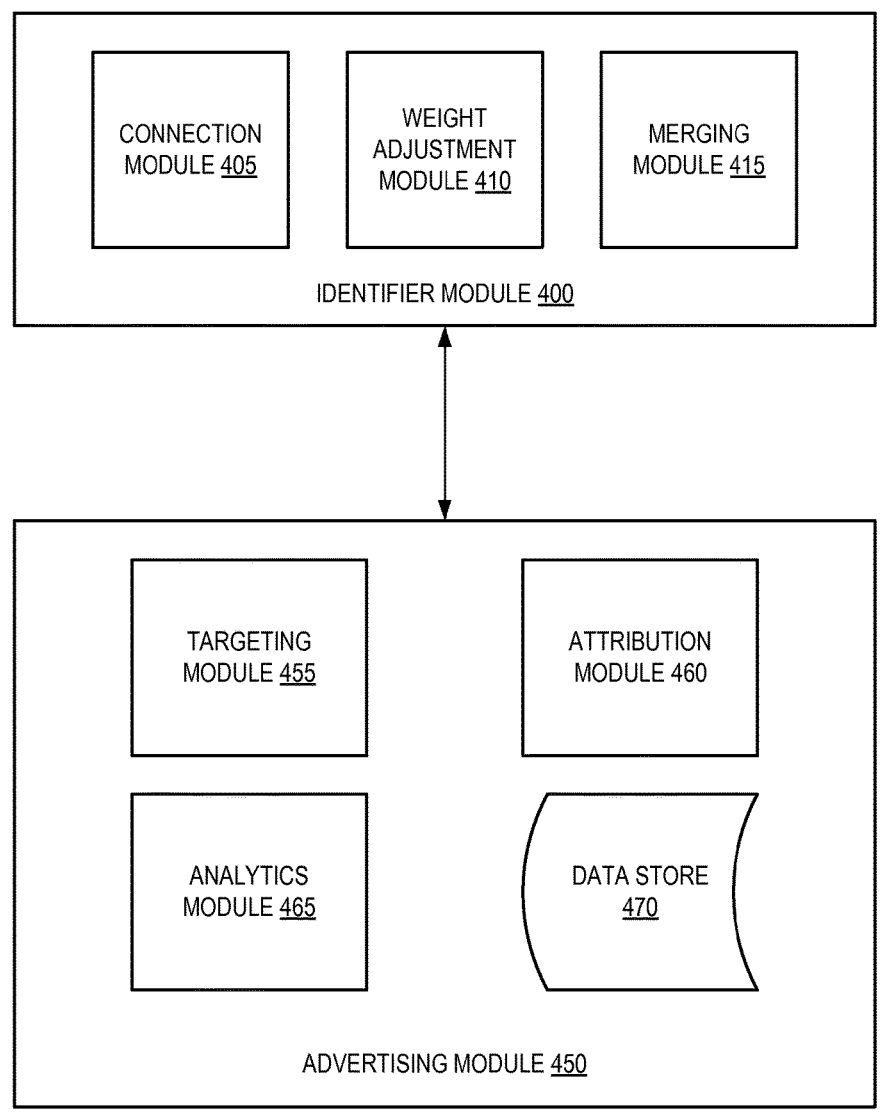
FIG. 4 is a block diagram illustrating an identifier module and an advertising module, according to one embodiment.

FIG. 4 is a block diagram illustrating an identifier module 400 and an advertising module 450, according to one embodiment. In one embodiment, the identifier module 400 and the advertising module 450 may reside on the same computing device (e.g., on the same server). In another embodiment, the identifier module 400 and the advertising module 450 may reside on different computing devices (e.g., identifier module 400 resides on a tracking server and advertising module 450 resides on an advertisement server, as illustrated in FIG. 3). More or less components may be included in the identifier module 400 and/or the advertising module 450 without loss of generality.

The identifier module 400 may create and/or obtain device graphs (as illustrated in FIGS. 1 and 2) based on network data and/or login information and may update the device graphs (e.g., add/remove device identifiers, add/remove connections, adjust or modify the weights for the connections) based on the network data and/or login information, as described above in conjunction with FIGS. 1-3. The identifier module 400 includes a connection module 405, a weight adjustment module 410, and a merging module 415.

In one embodiment, the connection module 405 may identify connections between device identifiers. For example, the connection module 405 may identify a connection between two device identifiers if network data indicates that the two device identifiers have appeared on the same network. In another example, the connection module 405 may identify a connection between two device identifiers if the two devices associated with the device identifiers use the same login information to access content from an advertiser/publisher. In another embodiment, the connection module 405 may add a new device identifier to a device graph and may add a connection for the new device identifier to an existing device identifier in the device graph, based on the network data. In a further embodiment, the connection module 405 may remove device identifiers and/or connections between the device identifiers from the device graphs, based on various criteria or conditions, as discussed above in conjunction with FIG. 3.

In one embodiment, the weight adjustment module 410 may adjust or modify the weight of the connections between different device identifiers. For example, the weight adjustment module 410 may increase a weight of a connection between two device identifiers if the two device identifiers use the same network within a period of time. In another example, the weight adjustment module 410 may decrease the weight of the connection between two device identifiers if the two device identifiers do not use the same network for a period of time.

The merging module 415 may merge different device identifiers into a merged identifier, as illustrated in FIG. 2. In one embodiment, the merging module 415 may merge two device identifiers if the two device identifiers are associated with the same user credentials for a server. For example, the merging module 415 may merge two device identifiers if the two devices that are associated with the two device identifiers have logged into the same server (e.g., the same email site, the same social network site) using the same user credentials (e.g., username, password, etc.). The user credentials (e.g., the login information) associated with the device identifiers may be obtained from a server (e.g., a network data server, a content server, a merchant server, etc.). In another embodiment, the merging module 415 may merge two device identifiers if the merging module 415 determines that the two device identifiers originate from the same computing devices. For example, the merging module 415 may merge two device identifiers if the first device identifier is for a smartphone and the second device identifier is for an application installed on the smartphone. In another embodiment, device identifier may be merged when cookie syncing is performed.

The identifier module 400 may be communicatively coupled to the advertising module 450. The advertising module 450 includes a targeting module 455, an attribution module 460, an analytics module 465 and a data store 470. The identifier module 400 may provide device graphs (as illustrated in FIGS. 1 and 2) to the advertising module 450. In one embodiment, the identifier module 400 may provide other types of data indicative of device identifiers, connections between the device identifiers, and weights to the advertising module 450. For example, the identifier module 400 may provide data such as Table 1, to the advertising module 450. The advertising module 450 may use the device graphs and/or other data provided by the identifier module 400 to perform one or more ad targeting/retargeting, ad attribution, and analysis of advertisements and user behaviors.

In one embodiment, the targeting module 455 may perform target or re-target advertisements to different devices, based on a device graph. For example a first device (e.g., a laptop computer) associated with a first device identifier (e.g., a cookie ID) may have visited a particular website. The device graph may indicate that the first device identifier is connected to a second device identifier and that the connection has a high weight (e.g., the first device is closely associated with the second device, such as a smartphone) or that the connection has been established based on login information from partners (e.g., advertisers, publishers). The targeting module 455 may provide the same advertisements or the same types of advertisements that were provided to the first device, to the second device. For example, an advertisement for camping gear may have been provided to the first device. The targeting module 455 may provide other advertisements for the same camping gear or may provide advertisements for items and/or services related to camping, to the second device.

In one embodiment, the targeting module 455 may add the first device identifier and the second device identifier to an audience record. The audience record may later be used to perform ad targeting and/or retargeting. For example, the targeting module 455 may target all device identifiers in an audience record with the same advertisements. The targeting module 455 may add device identifiers A, B, C, and D to the audience record because those device identifiers are connected to each other and the connections have higher weights or that the connections have been established based on login information from partners (e.g., advertisers, publishers). The device graph may allow the targeting module 455 to target ads to a user across multiple computing devices (e.g., target ads to a laptop computer, a tablet computer, a smartphone, a game console, and a smart TV that all belong to the same user) thereby improving reach, effectiveness, and value of the advertisements or advertising campaign. In one embodiment, the targeting module 455 may update, modify, and/or optimize an advertisement campaign based on the device graph and/or the impression history. For example, the impression history may indicate the number of times different devices have seen a certain advertisement. The targeting module 455 may switch to a different advertisement if that certain advertisement has been provided too many times to the different devices used by the user.

In another embodiment, the targeting module 455 may provide targeting/retargeting of other content besides advertisements, using the device graph and an impression history. For example, a news website may use the device graph and an impression history (that may include a list of content viewed by a user) to determine what articles that user has read across different devices (e.g., different computing devices) in order identify additional news articles that the user may be interested in. In another example, a bank may use the device graph to determine what types of searches a user has performed for different banking services across different devices (e.g., across different applications and/or computing devices). The bank may provide a particular banking offer (e.g., 0% interest) based on the searches performed using the multiple computing devices.

The attribution module 460 may perform ad attribution. For example, the attribution module 460 may attribute a conversion event (e.g., sale of a product and/or a service) to a particular advertisement (e.g., to a showing of the advertisement). Current methods of ad attribution generally work with a single identifier (e.g., a cookie ID) on a single computing device. For example, a user generally should view an ad and purchase a product in order for the purchase to be correctly attributed to the viewing of the ad. However, the attribution module 450 may use the device graph and the impression history to perform attribution across different devices. For example, a user may purchase an item from a vendor using a first device (e.g., a laptop computer) with a first identifier. The attribution module 460 may analyze the device graph to obtain other device identifiers (e.g., other devices) connected to the first device identifier. The attribution module 460 may then use the impression history to see if any advertisements from the vendor were provided to other devices associated with the other device identifiers. The attribution module 460 may determine that an advertisement from that vendor was previously displayed to a second device (e.g., a smartphone) and may attribute the conversion (e.g., a sale of an item) to that particular advertisement.

The analytics module 465 may perform one or more of brand studies, creative ad delivery, cross-device reporting, behavior analysis across devices, frequency capping, and lookalike modeling, based using the device graph and/or impression histories and/or audience records. In one embodiment, the analytics module 465 may perform creative ad delivery using the device graph and/or the impression history. For example, an advertisement may include three videos that present a story when shown in sequence (e.g., in order). When determining which of the three videos to show to a first device, the analytics module 465 may analyze the device graph to identify other device identifiers that are connected to the first device's device identifier. The analytics module 465 may then access the device graph and/or an impression history to determine whether any of the three videos were shown to other devices that are associated with the device identifiers. For example, the analytics module may determine that the first two video have already been shown to other devices in the device graph and/or the impression history, and may provide the third video to the first device.

In one embodiment, the analytics module 465 may perform behavior analysis across different computing devices of the user (e.g., across devices) using the device graph. For example, the analytics module 465 may determine that a user typically does online shopping during a particular time (e.g., during a lunch break) no matter what computing device the user is using. In another example, the analytics module 465 may determine that the user only reads his email from a particular email site using the user's laptop computer.

In one embodiment, the analytics module 465 may perform frequency capping using the device graph and/or the impression history. For example, the analytics module 465 may determine that a particular advertisement has been shown to other device that are associated with a current device, more than a threshold number of times (e.g., an advertisement has already been shown to a user 5 times across their laptop computer, smartphone, and tablet computer). The analytics module 465 may determine the advertisement should not be provide to the user on the current device (e.g., may cap or limit the number of times the advertisement is shown) in order to help prevent overexposure of the advertisement.

In one embodiment, the analytics module 465 may perform look-alike modeling using the device graph and/or the audience record. Lookalike modeling may be used by advertisers to target users which may a similar characteristics, features and/or behaviors. For example, lookalike modeling may be use to target people who enjoy the outdoors or people who enjoy playing a particular sport. The analytics module 465 may analyze a device graph and identify connections that have lower weights (e.g., because the device identifiers for the connections are not seen on the same network as often). The analytics module 465 may target these device identifiers to perform look-alike modeling. For example, a user may have a friend that periodically visits the user's home and uses the user's home Wi-Fi network to browse content online. The friend may use a different computing device with a different device identifier. The different device identifier may be weakly associated with the user's computing devices, because it is seen on the same network as the other computing devices. The friend may have the same interest, characteristics, or behaviors as the user (e.g., both the friend and the user may be interested in football, or both enjoy the same type of music, etc.). The analytics module 465 may target the friend's computing device with the same ads targeted to the user's computing devices, based on the lookalike modeling.

In one embodiment, the analytics module 465 may perform a brand study using the device graph. For example, using the device graph and an impression record, the analytics module may determine the number of times advertisements from a particular company or for a particular product (e.g., for a particular brand) were displayed to different users, independent of the device. The analytics module 465 may determine whether certain companies or products (e.g., certain brands) are of interest to different users, based on the number of advertisements for the company or products that were viewed by the user.

In one embodiment, the analytics module 465 may perform a cross-device analysis using the device graph. For example, the analytics module may 465 may analyze a user's actions (e.g., which advertisements a user has viewed and whether any conversions resulted from those advertisements) across different devices using the device graph and an impression history. The device graph and the impression history may allow the analytics module to determine which advertisements were displayed to a user on what device. The analytics module 465 may generate a cross-device report that indicates the different advertisements that were displayed on the devices the advertisements were displayed on.

Figure 5:
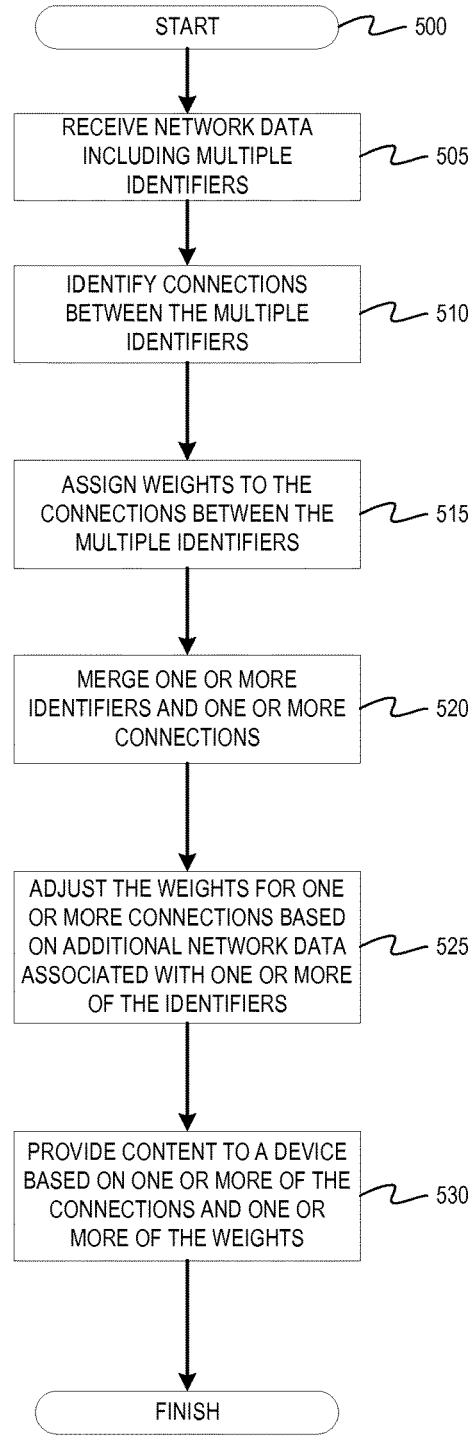
FIG. 5 is a flow diagram illustrating a method of identifying connections, according to one embodiment.
Figure 6:
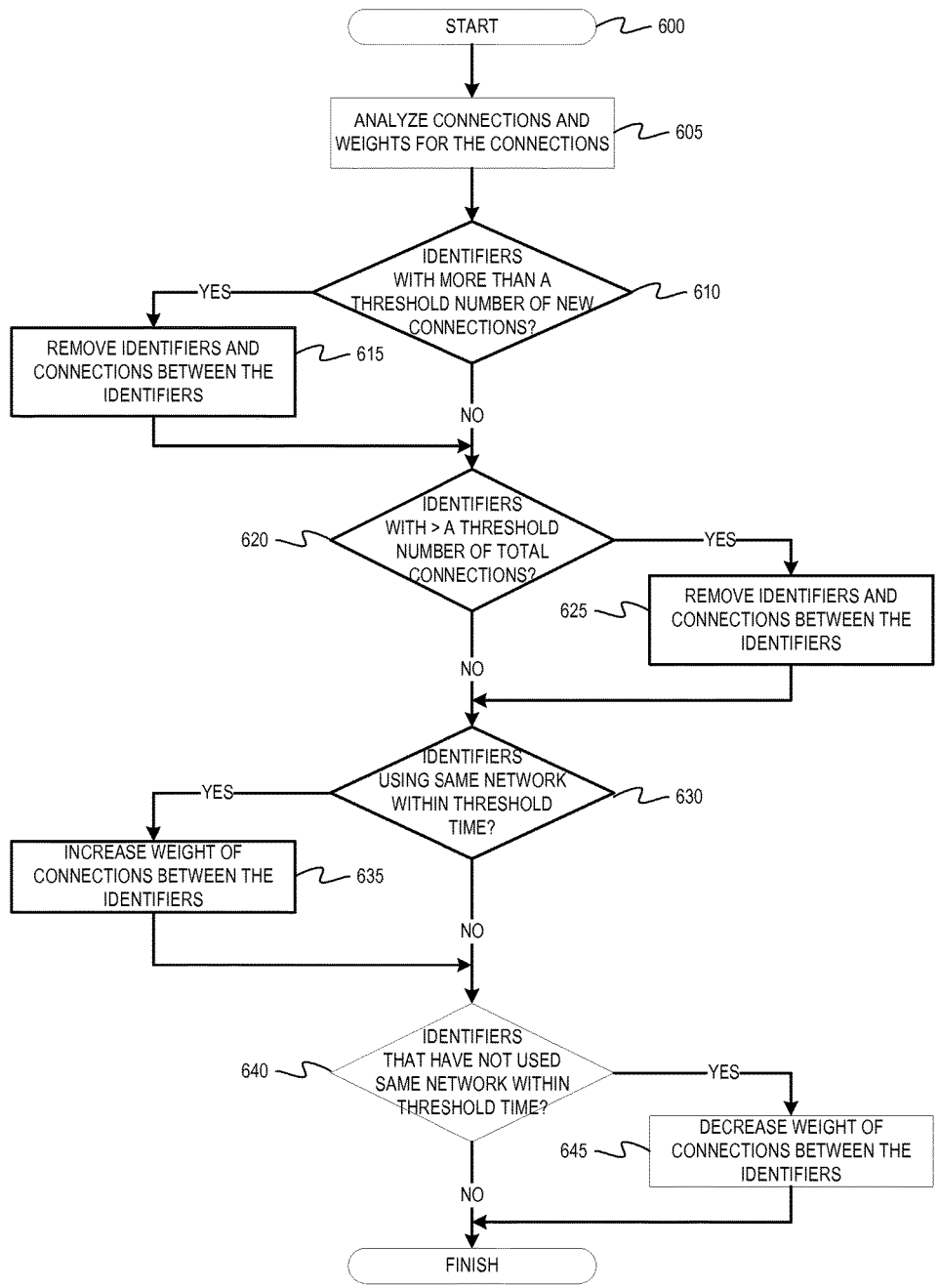
FIG. 6 is a flow diagram illustrating a method of updating connections and weights in a device graph, according to one embodiment.
Figure 7:
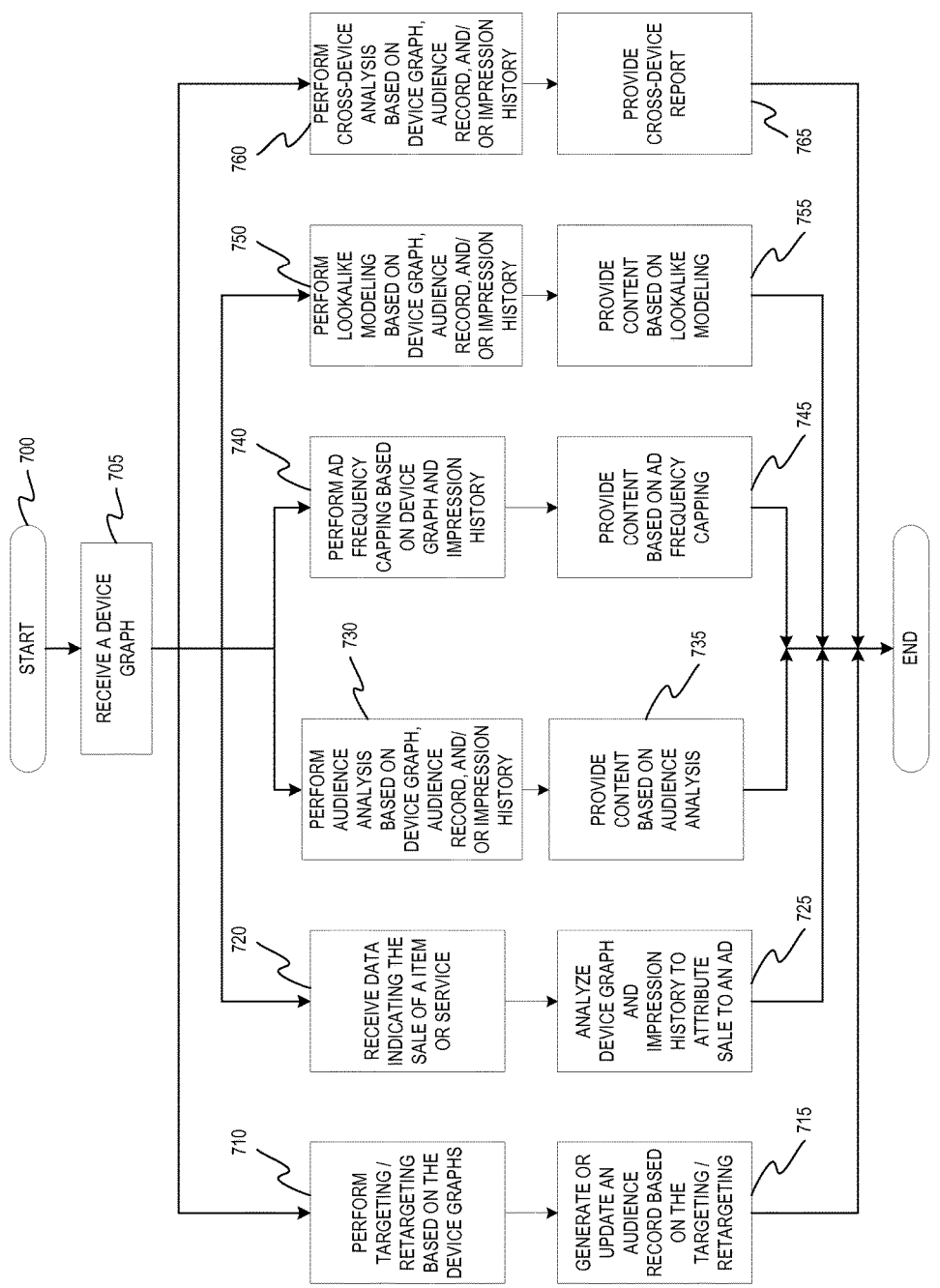
FIG. 7 is a flow diagram illustrating a method of using a device graph, according to one embodiment.

FIGS. 5-7 are flow diagrams illustrating methods for creating, managing, updating, and/or using device graphs. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of identifying connections, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by an identifier module, as shown in FIGS. 3-4.

Referring to FIG. 5, the method 500 starts at block 505 with the identifier module receiving multiple identifiers (e.g., device identifiers). For example, the identifier module may receive network data from multiple servers (e.g., a content server, a merchant server, a network data server, etc.) The network data may include multiple identifiers. At block 510 the identifier module may identify connections between the identifiers. For example, the identifier module may analyze the network data to determine whether devices (e.g., computing devices, applications, software, etc.) associated with two different identifiers were seen on the same network (e.g., the same residential network) or the connection can be established based on login information from partners (e.g., advertisers, publishers). The identifier module may assign weights to the connections between the multiple identifiers (block 515). Optionally, at block 520, the identifier module may merge multiple identifiers into a merged identifier and merge the connections for the multiple identifiers. For example, the identifier module may merge two identifiers together if the two identifiers are recognized as coming from the same device.

At block 525, the identifier module may receive additional network data associated with one or more of the identifiers and may adjust the weights for one or more connections, based on the additional network data. For example, the identifier module may increase the weight of a connection between two identifiers because the additional network data indicates that the device associated with the two identifiers used the same network. After adjusting the weights for the one or more connections, the identifier may provide content to a device (e.g., a computing device, an application, etc.) based on one or more of the connections and/or one or more of the weights (e.g., block 530). After block 530, the method 500 ends.

FIG. 6 is a flow diagram illustrating a method 600 of updating connections and weights in a device graph, according to one embodiment. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by an identifier module, as shown in FIGS. 3-4.

Referring to FIG. 6, the method 600 starts at block 605 with the identifier module analyzing the identifiers (e.g., device identifiers), connections, and/or the weights for the connections in a device graph (as illustrated in FIGS. 1-2). At block 610, the identifier module may determine whether any identifiers have greater than a threshold number of new connections. For example, the identifier module may determine whether an identifier has had more than twenty-four new connections added within the last hour. If there are identifiers that have greater than a threshold number of new connections, the method 600 proceeds to block 615 where the identifier module removes the connections between the identifiers and/or the identifiers from the device graph. If no identifiers have greater than the threshold number of new connections, the method 600 proceeds to block 620 where identifier module determines whether any identifiers have greater than a threshold number of total connections. For example, the identifier module may determine whether any identifiers have greater than forty connections. If there are identifiers that have greater than the threshold number of total connections, the method 600 proceeds to block 625 where the identifier module removes the identifiers and/or the connections between the identifiers.

If no identifiers have greater than the threshold number of total connections, the method 600 proceeds to block 630 where the identifier module determines whether any identifiers have used (e.g., have been observed or seen on) the same network within a threshold time. For example, the identifier module may determine whether two identifiers have been seen on the same network within the last seven days. If there are identifiers that have been seen on the same network within the threshold time, the method 600 proceeds to block 635 where the identifier module increases the weight of the connections between the identifiers that have been seen on the same network. If no identifiers have been seen on the same network within the threshold time, the method 600 proceeds to block 640 where the identifier module determines whether there are any identifies that have not been seen on the same network within a threshold time. For example, the identifier module may determine whether there are any identifiers that have not been seen on the same network in the last thirty days. If there are identifiers that have not been seen on the same network within a threshold time, the method 600 proceeds to block 645 where the identifier module decrease the weights of the connections between the identifiers. After block 645, the method 600 ends.

FIG. 7 is a flow diagram illustrating a method of using a device graph, according to one embodiment. The method 700 may be performed by processing logic that comprises hardware (e.g., circuitry, dedicated logic, programmable logic, microcode, etc.), software (e.g., instructions run on a processor to perform hardware simulation), or a combination thereof. In one embodiment, method 700 may be performed by an advertising module, as shown in FIG. 4.

The method 700 starts at block 705 where the advertising module receives a device graph. For example, the advertising module may receive the device graph from an identifier module (as illustrated in FIGS. 3-4). After receiving the device graph, the method 700 may proceed to one or more of blocks 710, 720, 730, 740, 750 and 760. If the method proceeds to block 710, the advertising module may perform targeting and/or retargeting of ads based on the device graph (as discussed above in conjunction with FIG. 4). After block 710, the method 700 proceeds to block 715 where the advertising module may generate an audience record or may update an existing audience record, based on the targeting and/or retargeting of ads. If the method proceeds to block 720, the advertising module receives data indicating the conversion event (e.g., sale of an item and/or a service). After block 720, the method 700 proceeds to block 725 where the advertising module may analyze the device graph and the impression history to attribute the sale to a particular advertisement (as discussed above in conjunction with FIG. 4). If the method 700 proceeds to block 730 the advertising module may perform audience analysis (e.g., may analyze the behavior of a user) based on the device graph, an audience record, and/or an impression history. At block 735, the advertising module may provide content (e.g., an advertisement) to a device based on the audience analysis (as discussed above in conjunction with FIG. 4).

If the method 700 proceeds to block 740 the advertising module may perform ad frequency capping based on the device graph and the impression history (as discussed above in conjunction with FIG. 4). At block 745, the advertising module may provide content (e.g., an advertisement) to a device based on the ad frequency capping. If the method 700 proceeds to block 750 the advertising module may perform lookalike modeling based on the device graph, an impression history, and/or an audience record (as discussed above in conjunction with FIG. 4). At block 755, the advertising module may provide content (e.g., an advertisement) to a device based on the lookalike modeling. If the method 700 proceeds to block 760, the advertising module may perform a cross-device analysis based on the device graph, an audience record, and/or an impression history. At block 765, the advertising module may provide a cross-device report/analysis to a server or a user.

Figure 8:
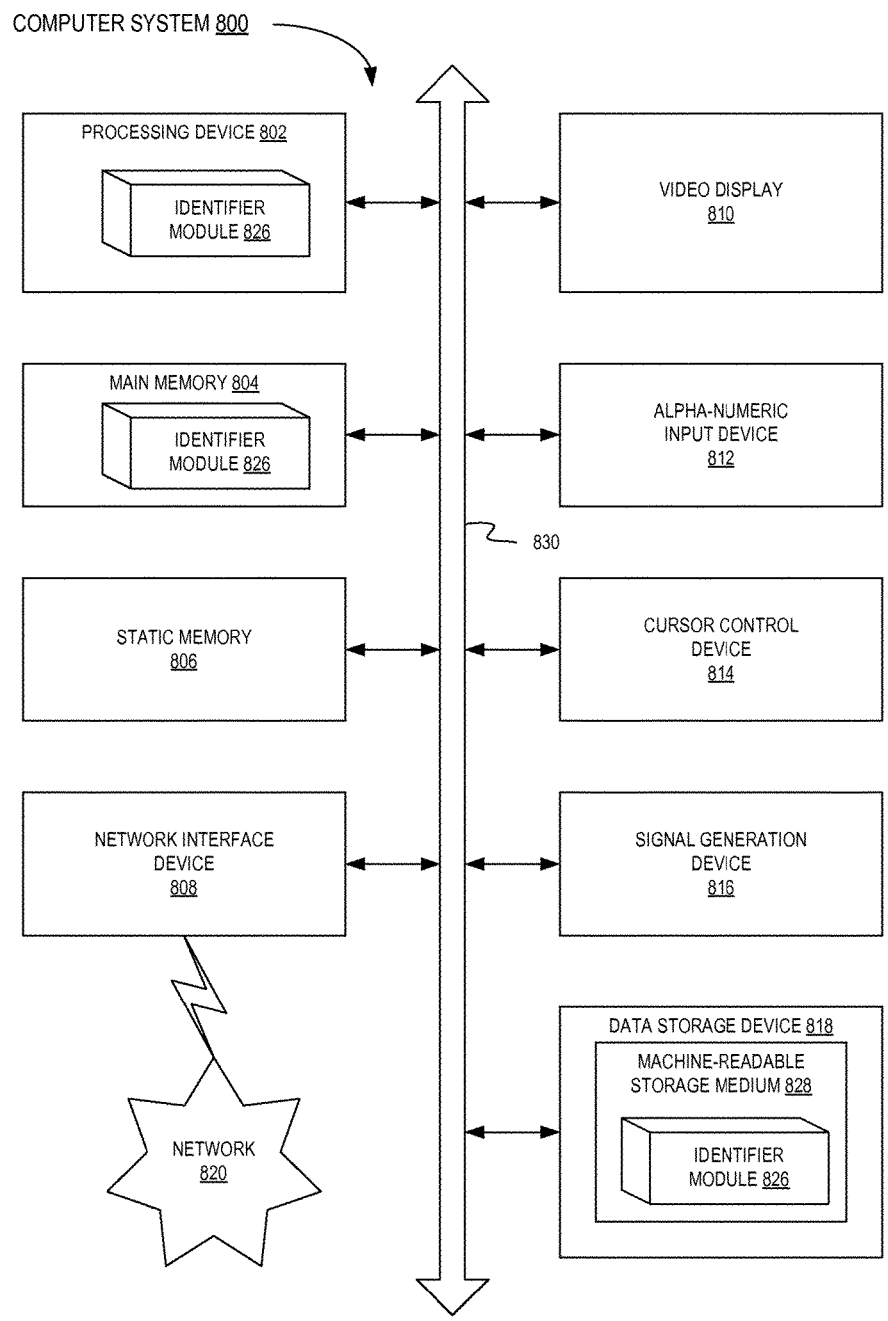
FIG. 8 is a block diagram illustrating one embodiment of a computing device, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a Personal Computer (PC), a set-top box, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (e.g., a processor) 802, a main memory 804 (e.g., flash memory, Random Access Memory (RAM), a static memory 806 (e.g., flash memory, Static Random Access Memory (SRAM)) and a data storage device 818, which communicate with each other via a bus 830.

Processing device 802 represents one or more general-purpose processing devices such as a microprocessor, central processing unit, or the like. More particularly, the processing device 802 may be a Complex Instruction Set Computing (CISC) microprocessor, Reduced Instruction Set Computing (RISC) microprocessor, Very Long Instruction Word (VLIW) microprocessor, or a processor implementing other instruction sets or processors implementing a combination of instruction sets. The processing device 802 may also be one or more special-purpose processing devices such as an Application Specific Integrated Circuit (ASIC), a Field Programmable Gate Array (FPGA), a Digital Signal Processor (DSP), network processor, or the like. The processing device 802 is configured to execute the identifier module 826 for performing the operations and steps discussed herein.

The computer system 800 may further include a network interface device 808 which may communicate with a network 820. The computer system 800 also may include a video display unit 810 (e.g., a Liquid Crystal Display (LCD) or a Cathode Ray Tube (CRT)), an alphanumeric input device 812 (e.g., a keyboard), a cursor control device 814 (e.g., a mouse) and a signal generation device 816 (e.g., a speaker).

The data storage device 818 may include a computer-readable medium 828 on which is stored one or more sets of instructions (e.g., instructions of identifier module 826) embodying any one or more of the methodologies or functions described herein. The identifier module 826 may also reside, completely or at least partially, within the main memory 804 and/or within the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media and magnetic media.

In the embodiments described above that obtain may device identifiers for different devices, or may make use of device identifiers, the users may be provided with an opportunity to control whether programs or features collect user information (e.g., device identifiers used by a user's devices), or to control whether and/or how to receive content or advertisements from a server that may be more relevant to the user. In addition, certain data may be modified or obfuscated in one or more ways before it is stored or used, so that any personally identifiable information is removed (e.g., a hash function may be applied to an IMEI number or a MAC address). Thus, the user may have control over how information is collected about the user and used by different servers.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "assigning," "adjusting," "providing," "determining," "merging," "increasing," "decreasing," "targeting," "generating," "attributing," "performing," "obtaining," "limiting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, Read-Only Memories (ROMs), Random Access Memories (RAMs), EPROMs, EEPROMs, magnetic or optical cards, flash memory, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
receiving, by a computer system, a first identifier and a second identifier from a data source, wherein the first identifier is associated with a first device operating on a computer network and wherein the second identifier is associated with a second device operating on the computer network;
dynamically identifying, by the computer system executing an identification module, a connection between the first identifier and the second identifier based on a first set of network data for the first device and the second device communicated from a tracking server to the identification module, wherein the tracking server monitors a plurality of devices as the plurality of devices are operating on the computer network, wherein the first set of network data includes:
a device identifier for a respective device or application,
information indicative of a type of a network used by the device,
any identifier for the network on which respective devices communicate;
any identifier for servers that host content being accessed by the respective devices,
any information about an application being used;
any website header information; and
a time stamp indicating a time that content was accessed; and
wherein the identified connection is indicative of an association between the first device and the second device;
generating an identification signature based on the received network data for respective devices, and comparing generated identification signatures as part of the identification of connections between the respective devices;
storing, by the computer system, information on the first identifier, the second identifier, and information on the identified connection that indicates a basis for the connection between the first identifier and the second identifier as a data structure that further specifies information capable of representation on a device graph that specifies a plurality of devices and their associated connections;
assigning, by the computer system, a base weight having a numeric value to the connection between the first identifier and the second identifier based on the first set of network data for the first device and the second device;
updating, by the computer system, the data structure to include the base weight assigned to the connection, wherein the base weight is indicative of how closely the connected device identifiers are associated;
repeatedly adjusting over time, by the computer system, the numeric value defining a weight of the connection between the first identifier and the second identifier based on new network data for the first device and the second device communicated by the tracking server, wherein the act of adjusting the weight of the connection includes acts of:
incrementing the weight of the connection responsive to determining that the first device and the second device use a same network within a period of time based on analysis of the timestamps for network activity associated with respective devices;
decrementing the weight of the connection responsive to determining that the first device and the second device do not use the same network within a period of time based on analysis of the timestamps for network activity associated with respective devices; and
updating the data structure with the adjusted weight for the connection;
merging, by the computer system, a plurality of device identifiers into a merged device identifier, wherein merging the plurality of device identifiers includes:
storing the merged identifier in the data structure as a record of equivalent device identifiers; and
updating, by the computer system, a respective weight for a connection of the merged device identifier, wherein the act of updating the respective weight for the connection includes at least an act of summing respective weights for respective connections associated with the plurality of device identifiers incorporated into the merged device identifier;
triggering updating operations over time of the respective weight for the connection of the merged device identifier responsive to new network data associated with the constituent elements of the merged device identifier based on execution of increment and decrement operations executed on a weight of an associated connection for the merged device identifier;
wherein the act of updating includes identifying a respective device associated with a merged device identifier based on a respective identification signature and matching the respective device identifier to the merge device identifier;
providing, by the computer system, digital content to one or more of the first device and the second device over the communication network, based on the connection and the weight of the connection obtained from the data structure, wherein the act of providing content includes at least one of a plurality of acts comprising:
targeting content to users or audiences across different computing devices;
attributing online activity across different devices; and
targeting content based on lookalike modeling across different devices; and
wherein the method further comprises an act of excluding, by the computer system, some subset of network data from analysis for identifying connections between devices responsive to analyzing a type of network for the respective network data, wherein the act of excluding includes an act of determining a subset of network data is associated with a commercial network.

2. The method of claim 1, wherein the method comprises deriving a device or application identifier from a user-agent string, and using the device or application identifier in subsequent analysis.

3. The method of claim 1, wherein identifying the connection between the first identifier and the second identifier comprises:
determining whether the first device and the second device have logged into one or more services using a same login information, based on analysis of a hash generated from the login information associated with a first device identifier, and analysis of a hash generated from the login information associates with at least a second device identifier.

4. The method of claim 1, further comprising:
receiving additional identifiers from the data source, wherein the additional identifiers are associated with additional devices;
identifying additional connections between the additional identifiers, the first identifier, and the second identifier;
assigning an additional weight to each of the additional connections;
adjusting the additional weights of the additional connections based on a third set of network data for the first device, the second device, and the additional devices; and
providing content to one or more of the first device, the second device, or the additional devices based on one or more of the connection, the additional connections, the weight, or the additional weights.

5. The method of claim 4, wherein a set of connections to the first identifier are removed from the data structure when the set of connections exceeds a threshold size or when a number of connections in the set of connections increases by a threshold amount within a threshold amount of time.

6. The method of claim 1, wherein the act of merging the plurality of device identifiers into the merged device identifier includes an act of merging respective connections for the multiple identifiers, and storing the merged connection for the merged device identifier in the device graph.

7. The method of claim 1, further comprising:
generating an audience record; and
targeting additional content to the second device based on one or more of the connection, the weight, or the audience record of the first device.

8. The method of claim 1, further comprising:
attributing a conversion event originating from the second device, to an advertisement viewed on the first device, based on one or more of the connection, the weight, or an impression history.

9. The method of claim 4, further comprising:
performing lookalike modeling based on one or more of the connection, the additional connections, the weight, the additional weights, an audience record, or an impression history.

10. The method of claim 4, further comprising:
recording an impression history; and
limiting frequency of an advertisement based on one or more of the impression history, the connection, the additional connections, the weight, or the additional weights.

11. The method of claim 4, further comprising:
performing an analysis of a behavior of a user based on one or more of an audience record, an impression history, the connection, the additional connections, the weight, or the additional weights.

12. A computer system comprising:
a memory configured to store a plurality of identifiers; and
a processing device, coupled to the memory, the processing device configured to:
receive, from a network interface device, a first identifier and a second identifier from a data source, wherein the first identifier is associated with a first device and wherein the second identifier is associated with a second device;
identify a connection between the first identifier and the second identifier based on a first set of network data for the first device and the second device, wherein the identified connection is indicative of an association between the first device and the second device and wherein the first set of network data is received from a tracking server, and wherein network data includes at least:
a device identifier for a device or application,
a timestamp specifying a time that content was accessed,
information associated with a type of a network used by the device,
information associated with activity executed by respective devices or applications on the network;
store, in the memory, information on the first identifier, the second identifier, and the identified connection between the first identifier and the second identifier as a data structure having data records including a first identifier, a connection to a second identifier, a basis for the connection, and a weight associated with the connection, that specifies information capable of representation on a device graph that graphically specifies devices, their associated connections, and respective weights for the associated connections;
assign a base weight having a numeric value to the connection between the first identifier and the second identifier based on the first set of network data for the first device and the second device;
update the data structure to include the base weight assigned to the connection, wherein the base weight includes information indicative of how closely the first identifier and second identifier are associated;
adjust the numeric value defining a weight of the connection between the first identifier and the second identifier based on a second set of network data for the first device and the second device received from the network interface device, wherein the processing device is further configured to:
determine a first device accessed a first network in a first time window based on analysis of the first network data and associated timestamps for network activity;
determine a second device access the first network in the first time window based on analysis of the first network data and associated timestamps for the network activity;
increment the weight of the connection responsive to determining that the first device and the second device use a same network within the first time window;
decrement the weight of the connection responsive to determining that the first device and the second device do not use the same network within the first time window; and
update the data structure with the adjusted weight for the connection;
merge a plurality of device identifiers into a merged device identifier, wherein merging the plurality of device identifiers includes:
storing the merged identifier in the data structure as a record of equivalent device identifiers; and
updating a respective weight for a connection of the merged device identifier, wherein the act of updating the respective weight of the connection includes at least an act of summing respective weights for respective connections associated with the plurality of device identifiers incorporated into the merged device identifier;

and
provide content to one or more of the first device and the second device, based on the connection and the weight of the connection obtained from the data structure, wherein the act of providing content include identifying a group of devices having connections and associated weight values meeting a minimum threshold wherein the processing device is further configured to:
  target content to users or audiences across different computing devices that are identified as having the connections and the associated weight value meeting the minimum threshold;
  attribute online activity across different devices; and
  target content based on lookalike modeling across different devices that are identified as having the connections and the associated weight value meeting the minimum threshold.

13. The system of claim 12, wherein the processing device is further configured to:
  receive additional identifiers from the data source, wherein the additional identifiers are associated with additional devices;
  identify additional connections between the additional identifiers, the first identifier, and the second identifier;
  assign an additional weight to each of the additional connections;
  adjust the additional weights of the additional connections based a third set of network data for the first device, the second device, and the additional devices; and
  provide content to one or more of the first device, the second device, or the additional devices based on one or more of the connection, the additional connections, the weight, or the additional weights.

14. The system of claim 12, wherein the processing device is configured to adjust the weight of the connection between the first identifier and the second identifier by:
  removing a set of connections when the set of connections exceeds a threshold size or when a number of connections in the set of connections increases by a threshold amount within a period amount of time.

15. The system of claim 12, wherein the processing device is configured to identify the connection between the first identifier and the second identifier by:
  determining whether the first device and the second device use a same network; or
  determining whether the first device and the second device have logged into one or more services using a same login information.

16. A non-transitory computer-readable storage medium storing instructions which, when executed, cause a processing device to perform operations comprising:
  receiving, by a computer system, a first identifier and a second identifier from a data source, wherein the first identifier is associated with a first device and wherein the second identifier is associated with a second device;
  identifying, by the computer system, a connection between the first identifier and the second identifier based on a first set of network data for the first device and the second device received from a tracking server, wherein the first set of network data includes:
    a device identifier for a device or application,
    information associated with a type of a network used by the device,
    and
    a timestamp specifying a time that content was accessed; and
  wherein the identified connection is indicative of an association between the first device and the second device;
  storing, by the computer system, information on the first identifier, the second identifier, and the identified connection between the first identifier and the second identifier as a data structure that defines information capable of representation on a device graph that represents devices and their associated connections;
  assigning, by the computer system, a base weight having a numeric value to the connection between the first identifier and the second identifier based on the first set of network data for the first device and the second device;
  updating, by the computer system, the data structure to include the base weight assigned to the connection, wherein the base weight is indicative of how closely the connected device identifiers are associated;
  adjusting, by the computer system, the numeric value defining a weight of the connection between the first identifier and the second identifier based on a second set of network data for the first device and the second device, wherein the act of adjusting the weight of the connection includes acts of:
    incrementing the weight of the connection responsive to determining that the first device and the second device use a same network within a period of time based on analysis of the timestamps for network activity associated with respective devices;
    decrementing the weight of the connection responsive to determining that the first device and the second device do not use the same network within a period of time based on analysis of the timestamps for network activity associated with respective devices; and
    updating the data structure with the adjusted weight for the connection;
  merging, by the computer system, a plurality of device identifiers into a merged device identifier data record, wherein merging the plurality of device identifiers includes:
    storing the merged identifier in the data structure capable of representation on a device graph as a node comprising equivalent device identifiers; and
    updating, by the computer system, a respective weight for a connection of the merged device identifier, wherein the act of updating the respective weight of the connection includes at least an act of summing respective weights for respective connections associated with the plurality of device identifiers incorporated into the merged device identifier;
    triggering updates over time to the respective weight for the connection of the merged device identifier responsive to new network data associated with the constituent elements of the merged device identifier, the act of updating including execution of increment or decrement operations executed on a weight of an associated connection for the merged device identifier based on analysis of the timestamps for network activity associated with respective devices of the merged device identifier; and
  providing, by the computer system, content to one or more of the first device and the second device, based on the connection and the weight of the connection obtained from the data structure, wherein the act of providing content includes at least one of a plurality of acts comprising:

targeting content to users or audiences across different computing devices;

attributing online activity across different devices; and targeting content based on lookalike modeling across different devices.

17. The non-transitory computer-readable storage medium of claim 16, wherein the operations further comprise:

receiving additional identifiers from the data source, wherein the additional identifiers are associated with additional devices;

identifying additional connections between the additional identifiers, the first identifier, and the second identifier;

assigning an additional weight to each of the additional connections;

adjusting the additional weights of the additional connections based a third set of network data for the first device, the second device, and the additional devices; and providing content to one or more of the first device, the second device, or the additional devices based on one or more of the connection, the additional connections, the weight, or the additional weights.

18. The non-transitory computer-readable storage medium of claim 16, wherein adjusting the weight of the connection between the first identifier and the second identifier further comprises:

removing a set of connections when the set of connections exceeds a threshold size or when a number of connections in the set of connections increases by a threshold amount within a period amount of time.

19. The non-transitory computer-readable storage medium of claim 16, wherein identifying the connection between the first identifier and the second identifier comprises one or more of:

determining whether the first device and the second device use a same network; or determining whether the first device and the second device have logged into one or more services using a same login information.

20. The method of claim 1, wherein the tracking server is configured to capture information via execution of a tracking pixel.

21. The method of claim 1, wherein the computer system creates an audience record associated with the device identifiers and commonly accessed content by the devices, wherein the commonly accessed content is based on same content or same classification of content being accessed.

22. The method of claim 1, wherein providing content includes acts of targeting, attributing, analyzing behavior, frequency capping, and lookalike modeling based on the device graph.

23. The method of claim 1, further comprising an act of discarding network data obtained outside of residential or home networks when determining a connection between device identifiers.

24. The method of claim 1, wherein the act of updating the respective weight for the connection is performed on a connection to or from the merged device identifier.

25. A computer implemented method comprising:

receiving, by a computer system, a plurality of identifiers including a first identifier, a second identifier, a third identifier, and a fourth identifier from a data source, wherein the first identifier is associated with a first device, the second identifier is associated with a second device, the third identifier is associated with a first application, and the forth identifier is associated with a second application;

identifying, by the computer system executing an identification module, a connection between the first identifier and the second identifier based on a first set of network data for the first device and the second device received from a tracking server, wherein the first set of network data includes at least: a device identifier for a device or application, a type of a network used by the device, and a timestamp specifying a time that content was accessed; and wherein the identified connection is indicative of an association between the first device and the second device;

identifying, by the computer system, executing an identification module, a connection between either of the third or fourth identifier and the first or second identifier based on a second set of network data, wherein the second set of network data includes at least: a device identifier for a device or application, a type of a network used by the device, and a timestamp specifying a time that content was accessed;

storing, by the computer system, information on the first identifier, the second identifier, the third identifier, the fourth identifier and the identified connection between the first identifier and the second identifier, and the identified connection between the third or fourth identifier and the first or second identifier, as a data structure that specifies information capable of representation on a device graph that specifies devices or applications and their associated connections;

assigning, by the computer system, a base weight having a numeric value to the identified connections, including the connection between the first identifier and the second identifier based on the respective network data, including the first network data for the first device and the second device, and including the connection between the third or fourth identifier and the first or second identifier based on the respective network data, including the second network data;

updating, by the computer system, the data structure to include the base weight assigned to the respective connection, wherein the weight for a respective connection is indicative of how closely the connected device identifiers are associated;

adjusting, by the computer system, the numeric value defining weights of the respective connections including the connection between the first identifier and the second identifier, and the connection between the third or fourth identifier and the first or second identifier based on a third set of network data associated with the first device, the second device, the first application, and the second application, wherein the act of adjusting the weight of the respective connection includes acts of:

incrementing the weight of a respective connection responsive to determining that the first device, the second device, the first application, and the second application use a same network within a period of time based on analysis of the timestamp for respective network activity;

decrementing the weight of a respective connection responsive to determining that the first device, the second device, the first application, and the second application do not use the same network within a period of time based on analysis of the timestamp for respective network activity; and updating the data structure with the adjusted weight for the respective connection;

merging, by the computer system, a plurality of device identifiers into a merged device identifier, wherein merging the plurality of device identifiers includes:

merging at least an application identifier with a device identifier;

storing the merged identifier in the data structure as a record of equivalent device identifiers; and updating, by the computer system, a respective weight for a connection of the merged device identifier, wherein the act of updating the respective weight for the connection includes at least an act of summing respective weights for respective connections associated with the plurality of device identifiers incorporated into the merged device identifier; and providing, by the computer system, content to one or more of the first device, the second device, the first application, and the second application based on the respective connection and the weight of the respective connection obtained from the data structure, wherein the act of providing content includes at least one of a plurality of acts comprising:

targeting content to users or audiences across different computing devices;

attributing online activity across different devices; and targeting content based on lookalike modeling across different devices.

26. The method of claim 1, further comprising an act of removing an identified connection from the data structure defining a connection between respective device identifiers, responsive to determining a value for the adjusted weight for the strength of the connection reaches zero.

27. The method of claim 1, further comprising an act of executing a look up function for internet protocol addresses within the network data to determine the type of network associated with the network data.

28. The method of claim 1, further comprising an act of excluding subsets of network data responsive to determining that a number of devices using a specific network exceeds a threshold number in a given period of time.

* * * * *